US010665115B2

(12) United States Patent
Fragoso et al.

(10) Patent No.: US 10,665,115 B2
(45) Date of Patent: May 26, 2020

(54) CONTROLLING UNMANNED AERIAL VEHICLES TO AVOID OBSTACLE COLLISION

(71) Applicant: California Institute of Technology, Pasadena, CA (US)

(72) Inventors: Anthony T. S. Fragoso, Los Angeles, CA (US); Larry H. Matthies, Northridge, CA (US); Roland Brockers, Pasadena, CA (US); Richard M. Murray, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 311 days.

(21) Appl. No.: 15/394,647

(22) Filed: Dec. 29, 2016

(65) Prior Publication Data
US 2017/0193830 A1 Jul. 6, 2017

Related U.S. Application Data

(60) Provisional application No. 62/274,924, filed on Jan. 5, 2016, provisional application No. 62/397,284, filed on Sep. 20, 2016.

(51) Int. Cl.
G08G 5/00 (2006.01)
G01C 21/00 (2006.01)
(Continued)

(52) U.S. Cl.
CPC ......... G08G 5/0069 (2013.01); B64C 39/024 (2013.01); G01C 21/005 (2013.01);
(Continued)

(58) Field of Classification Search
CPC ............ B64C 39/024; B64C 2201/141; B64C 2201/127; B64C 2201/146;
(Continued)

(56) References Cited

U.S. PATENT DOCUMENTS 8,234,068 B1 * 7/2012 Young ................... G01C 21/00
244/175
8,244,458 B1 8/2012 Blackburn
(Continued)

OTHER PUBLICATIONS

Bohlin, R., et al., "Path Planning Using Lazy PRM", Proceedings of the 2000 IEEE ICRA, San Francisco, CA, Apr. 2000.
(Continued)

Primary Examiner — Nicholas K Wiltey
(74) Attorney, Agent, or Firm — Gates & Cooper LLP

(57) ABSTRACT

A method, device, framework, and system provide the ability to control an unmanned aerial vehicle (UAV) to avoid obstacle collision. Range data of a real-world scene is acquired using range sensors (that provide depth data to visible objects). The range data is combined into an egospace representation (consisting of pixels in egospace). An apparent size of each of the visible objects is expanded based on a dimension of the UAV. An assigned destination in the real world scene based on world space is received and transformed into egospace coordinates in egospace. A trackable path from the UAV to the assigned destination through egospace that avoids collision with the visible objects (based on the expanded apparent sizes of each of the visible objects) is generated. Inputs that control the UAV to follow the trackable path are identified.

12 Claims, 9 Drawing Sheets

(51) Int. Cl.

| | |
|---|---|
| *G08G 5/04* | (2006.01) |
| *G06K 9/00* | (2006.01) |
| *G06K 9/62* | (2006.01) |
| *G05D 1/10* | (2006.01) |
| *B64C 39/02* | (2006.01) |
| *G01S 17/933* | (2020.01) |
| *G01S 17/89* | (2020.01) |
| *G01S 17/86* | (2020.01) |

(52) U.S. Cl.
CPC .......... *G05D 1/102* (2013.01); *G06K 9/0063* (2013.01); *G06K 9/00624* (2013.01); *G06K 9/6202* (2013.01); *G08G 5/045* (2013.01); *B64C 2201/126* (2013.01); *B64C 2201/127* (2013.01); *B64C 2201/141* (2013.01); *G01S 17/86* (2020.01); *G01S 17/89* (2013.01); *G01S 17/933* (2013.01)

(58) Field of Classification Search
CPC ........ B64C 2201/123; B64C 2201/145; G05D 1/102; G05D 1/0088; G05D 1/0011; G05D 1/0038; G05D 1/0094; G05D 1/101; G05D 13/00; G05D 1/0016; G05D 1/0202; G05D 1/042; G05D 1/104; G05D 1/12; B64D 47/08; G08G 5/0069; G08G 5/045; G08G 5/04; G06K 9/0063; H04N 5/232; H04N 5/247; H04N 21/4131; H04N 21/41422; H04N 21/4223; H04N 21/4227; H04N 5/23206; H04N 5/2328; H04N 5/4401; H04N 5/77; H04N 7/183; H04N 7/185; G01C 21/165; G01C 21/00; G01C 21/005; G06T 2207/10032; G06T 17/20; G06T 19/003; G06T 2210/12; G06T 7/20; G06T 7/248; G06T 7/579; G06T 7/70; G01S 19/42; G01S 3/7864; G06F 3/04815; G06F 3/04842; G06F 3/04847; G06F 3/0488; G06F 3/04883; G06Q 40/08; H04L 67/10
USPC .............. 701/2, 3, 15, 23; 382/103; 244/175
See application file for complete search history.

(56) References Cited

U.S. PATENT DOCUMENTS

| | | | | |
|---|---|---|---|---|
| 9,563,201 | B1* | 2/2017 | Tofte | G05D 1/0038 |
| 9,927,809 | B1* | 3/2018 | Tofte | G05D 1/0038 |
| 2005/0171654 | A1* | 8/2005 | Nichols | G08G 5/0078 701/15 |
| 2005/0216181 | A1 | 9/2005 | Estkowski et al. | |
| 2007/0080825 | A1 | 4/2007 | Shiller | |
| 2007/0093945 | A1* | 4/2007 | Grzywna | G05D 1/101 701/23 |
| 2008/0027591 | A1* | 1/2008 | Lenser | G05D 1/0251 701/2 |
| 2009/0087029 | A1* | 4/2009 | Coleman | G06K 9/00208 382/103 |
| 2011/0160950 | A1 | 6/2011 | Naderhirn et al. | |
| 2011/0178658 | A1* | 7/2011 | Kotaba | G01C 21/005 701/3 |
| 2012/0265380 | A1 | 10/2012 | Kuwata et al. | |
| 2015/0301529 | A1 | 10/2015 | Pillai et al. | |
| 2016/0070264 | A1* | 3/2016 | Hu | G08G 5/0069 701/2 |
| 2016/0070265 | A1* | 3/2016 | Liu | B64C 39/024 701/3 |
| 2016/0076892 | A1* | 3/2016 | Zhou | B64C 39/024 701/3 |
| 2016/0216710 | A1* | 7/2016 | Hu | G08G 5/0069 |
| 2016/0260328 | A1 | 9/2016 | Mishra et al. | |
| 2016/0299507 | A1 | 10/2016 | Shah et al. | |
| 2016/0341830 | A1* | 11/2016 | Dougan | G01S 19/23 |
| 2016/0378109 | A1* | 12/2016 | Raffa | G05D 1/0038 701/2 |
| 2017/0031369 | A1* | 2/2017 | Liu | G05D 1/102 |
| 2017/0052541 | A1* | 2/2017 | Hu | G08G 5/0069 |
| 2017/0053169 | A1* | 2/2017 | Cuban | H04N 7/185 |
| 2017/0123425 | A1* | 5/2017 | Zhao | G05D 1/102 |
| 2017/0134631 | A1* | 5/2017 | Zhao | G05D 1/12 |
| 2017/0193830 | A1 | 7/2017 | Fragoso et al. | |
| 2017/0253330 | A1* | 9/2017 | Saigh | B64C 39/024 |
| 2017/0255802 | A1 | 9/2017 | Falk et al. | |
| 2017/0269588 | A1* | 9/2017 | Lema | B64C 39/024 |
| 2017/0301111 | A1* | 10/2017 | Zhao | G06T 7/80 |
| 2018/0120847 | A1* | 5/2018 | Chen | B64C 39/024 |
| 2018/0203467 | A1* | 7/2018 | Zhou | G05D 1/12 |
| 2018/0354511 | A1 | 12/2018 | Meyer et al. | |

OTHER PUBLICATIONS

Brockers, R., et al., "Vision-Based Obstacle Avoidance for Micro Air Vehicles Using an Egocylindrical Depth Map", International Symposium on Experimental Robots, D. Kulic, et al. (eds.), 2016.

Brockers, R., et al., "Stereo Vision-based Obstacle Avoidance for Micro Air Vehicles using an Egocylindrical Image Space Representation", Proc. SPIE 9836, Micro- and Nanotechnology Sensors, Systems, and Applications VIII, 98361R, May 25, 2016.

Chitsaz, H., et al., "Time-optimal Paths for a Dubins airplane", Proceedings of the 46th IEEE Conference on Decision and Control, New Orleans, LA, USA Dec. 12-14, 2007.

Cole, D., et al., "Using Laser Range Data for 3D SLAM in Outdoor Environments", Proceedings of the 2006 IEEE International Conference on Robotics and Automation, Orlando, Florida, May 2006.

Dolson, J., et al., "Upsampling Range Data in Dynamic Environments", Conference on Computer Vision and Pattern Recognition, 2010.

Dryanovski, I., et al., "Multi-Volume Occupancy Grids: An Efficient Probabilistic 3D Mapping Model for Micro Aerial Vehicle", Proceedings of the IEEE/RSJ International Conference on Intelligent Robotics and Systems, Taipei, Taiwan, Oct. 18-22, 2010 / Proceedings of the IEEE/RSJ International Conference on Intelligent Robotics and Systems, Nov. 2010.

Engel, J., et al., "Semi-Dense Visual Odometry for a Monocular Camera", IEEE International Conference on Computer Vision, 2013. https://www.google.com/url?sa=t&rct=j&q=&esrc=s&source=web&cd=1&ved=0ahUKEwjHyfzysaDWAhWFiVQKHShuDVkQFggoMAA&url=https%3A%2F%2Fvision.in.turn.de%2F_media%2Fspezial%2Fbib%2Fengel2013iccv.

Engel, J., et al., "Large-Scale Direct SLAM with Stereo Cameras", International Conference on Intelligent Robots and Systems, 2015. https://www.google.com/url?sa=t&rct=j&q=&esrc=s&source=web&cd=1&ved=0ahUKEwjJj4ifsqDWAhWqsVQKHVuRAMUQFggoMAA&url=https%3A%2F%2Fvision.in.turn.de%2F_media%2Fspezial%2Fbib%2Fengel2015_stereo.lsdslam.

Faulwasser, T., et al., "Constrained reachability and trajectory generation for flat systems", Automatica, 50(4):1151-1159, 2014.

Ferstl, D., et al., "Image Guided Depth Up-sampling using Anisotropic Total Generalized Variation", IEEE International Conference on Computer Vision, Sydney, NSW, Australia, Dec. 1-8, 2013.

Forster, C., et al., "SVO: Fast Semi-Direct Monocular Visual Odometry", IEEE International Conference on Robotics and Automation, Hong Kong Convention and Exhibition Center, Hong Kong, China, May 31-Jun. 7, 2014.

Fragoso, A., et al., "Vision-based Autonomy for Micro-Air Vehicles: A Platform for Global Access to Sustainable, Affordable Aviation", an obstacle avoidance poster at a Caltech session, Jorgensen Lobby—Earle M. Jorgensen Laboratory, Caltech, Nov. 20, 2015.

Fragoso, A., et al., "A Fast Motion Planning Representation for Configuration Flat Robots with Applications to Micro Air Vehicles", American Control Conference, published Sep. 19, 2016.

Fraundorfer, F., et al., "Vision-Based Autonomous Mapping and Exploration Using a Quadrotor MAV", IEEE Int. Conf. on Intelli-

(56) References Cited

OTHER PUBLICATIONS gent Robots and Systems (IROS), 2012. http://people.inf.ethz.ch/lomeier/publications/IROS_2012_autonomous_vision_exploration.pdf.

Frazzoli, E., et al., "Maneuver-Based Motion Planning for Nonlinear Systems With Symmetries", IEEE Transactions on Robotics, vol. 21, No. 6, pp. 1077-1091, Dec. 2005.

Geiger, A., et al., "Efficient Large Scale Stereo Matching", Ascian Conference on Computer Vision, 2010.

Geiger, A., et al., "StereoScan: Dense 3d Reconstruction in Real-time", IEEE Intelligent Vehicles Symposium (IV), Baden-Baden, Germany, Jun. 5-9, 2011.

Geiger, A., et al., "Are we ready for Autonomous Driving?: The KITTI Benchmark Suite", IEEE Conference on Computer Vision and Pattern Recognition (CVPR), May 2012. http://www.cvlibs.net/publications/Geiger2012CVPR.pdf.

Hirschmuller, H., "Accurate and Efficient Stereo Processing by Semi-Global Matching and Mutual Information", IEEE Computer Society Conference on Computer Vision and Pattern Recognition, Jun. 20-25, 2005.

Hornung, A., et al., "OctoMap: an efficient probabilistic 3D mapping framework based on octrees", Auton Robot, 34:189-206, 2013.

Hosni, A., et al., "Temporally Consistent Disparity and Optical Flow via Efficient Spatio-temporal Filtering", Pacific-Rim Symposium on Image and Video Technology (PSIVT), Part I, LNCS 7087, pp. 165-177, 2011. https://pdfs.semanticscholar.org/c551/2e85d44961247f15deb0392c01e5bbd6e345.pdf?_ga=2.9547063.326711943.1505247615-962823624.1505247615.

Kahler, O., et al., "Hierarchical Voxel Block Hashing for Efficient Integration of Depth Images", IEEE Conference on Robotics and Automation Letters (ICRA), vol. 1, Issue 1, pp. 192-197, (accepted Dec. 2015) Jan. 2016.

Keshavan, J., et al., "Autonomous Vision-Based Navigation of a Quadrotor in Corridor-Like Environments", Micro Air Vehicles, 7(2):111-123, 2015.

Kitt, B., et al., "Visual Odometry based on Stereo Image Sequences with RANSAC-based Outlier Rejection Scheme", Intelligent Vehicle Symposium, 2010. http://www.cvlibs.net/publications/Kitt2010IV.pdf.

Kopf, J., et al., "Joint Bilateral Upsampling", ACM Transactions on Graphics, vol. 26, No. 3, Article 96, Jul. 2007.

Liu, M. Y., et al., "Joint Geodesic Upsampling of Depth Images", Conference on Computer Vision and Pattern Recognition, 2013.

Lu, J., et al., "Sparse Depth Super Resolution", Proceedings of the IEEE International Conference on Computer Vision and Pattern Recognition, Boston, MA, pp. 2245-2253, Jun. 7-12, 2015.

Matsuo, K., et al., "Depth Image Enhancement Using Local Tangent Plane Approximations", International Conference on Computer Vision and Pattern Recognition, 2015.

Matthies, L., et al., "Stereo vision-based obstacle avoidance for micro air vehicles using disparity space", IEEE International Conference on Robotics and Automation (ICRA), Hong Kong Convention and Exhibition Center, Hong Kong, China, pp. 3242-3249, May 31-Jun. 7, 2014.

Mellinger, D., et al., "Minimum Snap Trajectory Generation and Control for Quadrotors", IEEE International Conference on Robotics and Automation (ICRA), Shanghai International Conference Center, Shanghai, China, May 9-13, 2011.

Min, D., et al., "Depth Video Enhancement Based on Weighted Mode Filtering", IEEE Transactions on Image Processing, vol. 21, No. 3, Mar. 2012.

Murray, R. M., et al., "Differential Flatness of Mechanical Control Systems: A Catalog of Prototype Systems", ASME Int'l Mech Eng Congress and Expo, San Francisco, CA, Nov. 12-17, 1995.

Newcombe, R. A., et al., "KinectFusion: Real-Time Dense Surface Mapping and Tracking", IEEE International Symposium on Mixed and Augmented Reality, Science and Technology Proceedings, Basel, Switzerland, Oct. 26-29, 2011.

Ntouskos, V., et al., "Saliency prediction in the coherence theory of attention", Biologically Inspired Cognitive Architectures, vol. 5, pp. 10-28, 2013.

Ntouskos, V., et al., "Confidence driven TGV fusion", ALCOR Vision, Perception and Learning Robotics Lab, Department of Computer, Control and Management Engineering, University of Rome "La Sapienza", Mar. 30, 2016. https://arxiv.org/abs/1603.09302.

Or-El, R., et al., "RGBD-Fusion: Real-Time High Precision Depth Recovery", International Conference on Computer Vision and Pattern Recognition, 2015.

Otte, M. W., et al., "Path Planning In Image Space For Autonomous Robot Navigation in Unstructured Environments", Journal of Field Robotics, vol. 26, Issue 2, pp. 115-116, Feb. 2009.

Park, J., et al., "High Quality Depth Map Upsampling for 3D-TOF Cameras", IEEE International Conference on Computer Vision, Nov. 2011.

Pham, C. C., et al., "Efficient Spatio-Temporal Local Stereo Matching Using Information Permeability Filtering", International Conference on Image Processing, 2012.

Pizzoli, M., et al., "REMODE: Probabilistic, Monocular Dense Reconstruction in Real Time", IEEE International Conference on Robotics and Automation (ICRA), Hong Kong Convention and Exhibition Center, Hong Kong, China, May 31-Jun. 7, 2014.

Powers, C., et al., "Handbook of Unmanned Aerial Vehicles: Chapter 16—Quadrotor Kinematics and Dynamics", Editors: Valavanis & Vachtsevanos, Springer Netherlands, 2015. ISBN 978-90-481-9706-4.

Rathinam, M., et al., "Configuration Flatness of Lagrangian Systems Underactuated by One Control", In Control and Decision Conference (CDC), Kobe, Japan, 1996.

Richardt, C., et al., "Real-Time Spatiotemporal Stereo Matching Using the Dual-Cross-Bilateral Grid", European conference on Computer vision, 2010. http://richardt.name/dcbgrid/DCBGrid-preprint.pdf.

Richter, C., et al., "Polynomial Trajectory Planning for Aggressive Quadrotor Flight in Dense Indoor Environments", Proceedings of the International Symposium of Robotics Research (ISRR), 2013.

Scharstein, D., et al., "A Taxonomy and Evaluation of Dense Two-Frame Stereo Correspondence Algorithms", International Journal of Computer Vision, vol. 47(1/2/3), pp. 7-42, Apr.-Jun. 2002.

Scharstein, D., et al., "High-Resolution Stereo Datasets with Subpixel-Accurate Ground Truth", 36th German Conference on Pattern Recognition (GCPR), Muenster, Germany, Sep. 2-5, 2014.

Schmid, K., et al., "Stereo Vision based indoor/outdoor Navigation for Flying Robots", IEEE/RSJ International Conference on Intelligent Robots and Systems (IROS), Tokyo, Japan, Nov. 3-7, 2013.

Schneider, N., et al., "Semantically Guided Depth Upsampling", arXiv:1608.00753, Aug. 2016. https://www.researchgate.net/publication/305779544_Semantically_Guided_Depth_Upsampling.

Stauffer, C., et al., "Adaptive Background Mixture Models for Real-time Tracking", IEEE International Conference on Computer Vision and Pattern Recognition, vol. 2, Jun. 23-25, 1999.

Thomas, J., et al., "Toward image based visual servoing for aerial grasping and perching", IEEE International Conference on Robotics & Automation (ICRA), Hong Kong Convention and Exhibition Center, Hong Kong, China, May 31-Jun. 7, 2014.

Unger, C., et al., "Probabilistic Disparity Fusion for Real-time Motion Stereo", Asian Conference on Computer Vision, Queenstown, Nouvelle-Zélande, 2010. https://www.researchgate.net/publication/47363526_Probabilistic_Disparity_Fusion_for_Real-Time_Motion-Stereo.

Yang, Q., et al., "Spatial-depth Super Resolution for Range Images", IEEE Conference on Computer Vision and Pattern Recognition, Jun. 17-22, 2007.

Zhang, G., et al., "Consistent Depth Maps Recovery from a Video Sequence", IEEE Transactions on Pattern Analysis and Machine Intelligence, vol. 31, No. 6, Jun. 2009.

PCT International Search Report & Written Opinion dated Jan. 25, 2019 for PCT Application No. PCT/US2018/054142.

(56) References Cited

OTHER PUBLICATIONS

Lee, S-H., et al., "Robust Robot Navigation using Polar Coordinates in Dynamic Environments", Journal of Industrial and Intelligent Information, Mar. 2014, pp. 6-10, vol. 2, No. 1.

Fiorini, P., et al., "Motion Planning in Dynamic Environments using Velocity Obstacles", International Journal of Robotics Research, Jan. 1, 1995, pp. 1-40.

Kunwar, F., "Rendezvous-Guidance Trajectory Planning for Robotic Dynamic Obstacle Avoidance and Interception", IEEE Transactions on Systems, Man, and Cybernetics—Part B: Cybernetics, Dec. 2006, pp. 1432-1441, vol. 36, No. 6.

Bis, R., et al., "Velocity Occupancy Space: Robot Navigation and Moving Obstacle Avoidance With Sensor Uncertainty", ASME 2009 Dynamic Systems and Control Conference, vol. 1, Jan. 1, 2009. pp. 363-370, XP055543501.

Nelson, D., et al., "Vector Field Path Following for Miniature Air Vehicles", IEEE Transactions on Robotics, IEEE Service Center, Jun. 2007, pp. 519-529, vol. 23, No. 3.

Alsaab, A., et al., "Improving velocity obstacle approach for obstacle avoidance in indoor environments", 2014 UKACC International Conference on Control (CONTROL), Jul. 9, 2014, pp. 325-330.

Levy, A., et al., "The Extended Velocity Obstacle and applying ORCA in the real world", 2015 IEEE International Conference on Robotics and Automation (ICRA), May 2015, pp. 16-22.

Non-Final Office Action dated Feb. 2, 2020 for U.S. Appl. No. 16/150,585.

Gong, Jianwei et al., "VPH+: An enhanced vector polar histogram method for mobile robot obstacle avoidance", Proceedings of the 2007 IEEE International Conference on Mechatronics and Automation, Aug. 5-8, 2007, Harbin, China, pp. 2784 to 2788 (Year: 2007).

Kapadia, Mubbasir et al., "Parallelized egocentric fields for autonomous navigation", The Visual Computer (2012), 28:1209-1227, pp. 1209 to 122 (Year: 2012).

Snape, Jamie et al., "Goal Velocity Obstacles for Spatial Navigation of Multiple Autonomous Robots or Virtual Agents", Autonomous Robots and Multi robot Systems, St. Paul, Minn., 2013, 17 pages (Year: 2013).

Fragoso, Anthony et al., "Dynamically Feasible Motion Planning for Micro Air Vehicles using an Egocylinder", Conference Paper as published at ResearchGate, Sep. 2017, 15 pages (Year 2017).

"RIS Format Specifications", 9 pages, downloaded on Jan. 31, 2020 from: https://jira.sakaiproject.org/secure/attachment/21845/ RIS+ Format+Specifications.pdf (Year: 2020).

\* cited by examiner

CONTROLLING UNMANNED AERIAL VEHICLES TO AVOID OBSTACLE COLLISION

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/274,924, filed on Jan. 5, 2016, with inventor(s) Roland Brockers, Stephan M. Weiss, Larry H. Matthies, and Anthony T. Fragoso, entitled "Fast Autonomous Obstacle Avoidance for Micro Air Vehicle Flight in Highly Cluttered Environments"; and Provisional Application Ser. No. 62/397,284, filed on Sep. 20, 2016, with inventor(s) Anthony T. Fragoso, Larry H. Matthies, and Richard M. Murray, entitled "Fast Motion Planning Representation for Micro Air Vehicles".

STATEMENT REGARDING FEDERALLY SPONSORED RESEARCH AND DEVELOPMENT

The invention described herein was made in the performance of work under NASA Contract NNN12AA01C and is subject to the provisions of Public Law 96-517 (35 USC 202) in which the Contractor has elected to retain title.

BACKGROUND OF THE INVENTION

1. Field of the Invention

The present invention relates generally to unmanned aerial vehicles (UAVs), and in particular, to a method, system, apparatus, and article of manufacture for avoiding obstacles at high speeds using an arbitrary suite of range sensors.

2. Description of the Related Art (Note: This application references a number of different publications as indicated throughout the specification by reference names and year enclosed in brackets, e.g., [Name 20xx]. A list of these different publications ordered according to these reference names and year can be found below in the section entitled "References." Each of these publications is incorporated by reference herein.)

Micro air vehicles (MAVs) are a challenging UAV platform for high-speed autonomous flight in cluttered environments because their power and size restrictions severely limit the sensing and computational resources that can be carried onboard. As a result, obstacle detection and representation, trajectory generation, and motion planning must be performed in a highly compact and efficient fashion.

Vision-based obstacle detection has emerged as a popular way of satisfying constraints on sensing, primarily because cameras have low power requirements and are light enough to carry on even the smallest MAVs. Binocular stereo vision has been successfully used for forward-looking obstacle detection, and can be used to populate an occupancy grid world model that is useful for mapping and slow navigation missions [Fraundorfer 2012]. A second stereo vision-based approach that has received recent attention [Matthies 2014] avoids populating a voxel map and uses the disparity image format, as is acquired natively by the stereo pair, to directly and equivalently represent configuration space (C-space). Obstacles are artificially expanded by the vehicle dimensions directly in the disparity image coordinates, which admits fast collision-checking of trajectories as well as a simple and lightweight reactive motion planning algorithm. The disparity space representation has been generalized to an "egocylinder" by [Brockers1 2016], which offers a 360° field of regard as well as straightforward fusion of range data from stereo and monocular sensors into a single compact structure [Brockers2 2016].

Dynamical trajectory generation for MAVs typically relies on vehicle plant models with the differential flatness property, in which all vehicle states and controls can be expressed algebraically in terms of a smaller set of "flat outputs" [Murray 1995]. The class of differentially flat vehicles includes quadcopters as well as common car and fixed-wing aircraft abstractions, and is advantageous because trajectory generation for differentially flat vehicles does not require integration of the state equations. For quadcopters, differential flatness has been used to generate real-time "minimum snap" trajectories that penalize the fourth derivative of position to intentionally limit control input aggression [Mellinger 2011]. A minimum snap framework formed the basis of a trajectory generation scheme for obstacle avoidance over known maps in [Richter 2013]. When a vehicle is differentially flat in its configuration variables, a property known as configuration flatness, motion planning is further simplified because controls and state variables follow immediately from the vehicle's position relative to obstacles in C-space [Rathinam 1996]. The typical differentially flat point-mass MAV models receive such heavy use for obstacle avoidance because they are also configuration flat—a specialization that allows most of the control inputs and state variables to be entirely abstracted away from a navigation task. The quadcopter plant model of [Powers 2015], for example, is configuration flat in position once a yaw angle trajectory (which can be chosen independently of the obstacle layout without translating the vehicle) is chosen and can follow any feasible spatial trajectory. A connection between configuration flatness and computer vision is used by [Thomas 2014] in the context of MAV grasping and perching maneuvers.

In view of the above, what is needed is the ability to extend the compactness and efficiency advantages of disparity-space obstacle representations to an "egospace" data structure that can accommodate a general range sensor configuration. Further, what is needed is basic obstacle avoidance behavior in egospace coordinates, that may be used with unmanned vehicles (e.g., configuration flat vehicles) as part of a streamlined pipeline for motion planning in unknown, cluttered environments that are referred to herein as "egoplanning".

SUMMARY OF THE INVENTION

Embodiments of the invention provide a system, framework, and method for controlling the navigation of unmanned vehicles (e.g., configuration flat robots) to avoid obstacle collision in a cluttered environment. Range measurements from multiple sensors are represented compactly and a trajectory is generated in a data structure referred to as an egospace representation. Egospace generalizes depth image obstacle representations. In this regard, egospace uses the natural sensor geometry to combine the benefits of a multi-resolution and multi-sensor representation architecture into a single, simple, and efficient layer. With the egospace representation, motion planning over full configuration flat dynamics is conducted using motion primitives expressed directly in egospace coordinates or by direct forward integration of a vehicle model also expressed in the egospace coordinates. The motion planning output is then used to determine inputs that control the configuration flat dynamics to follow a trackable path.

Further embodiments of the invention provide the ability to perform temporal fusion on the depth maps resulting from the range measurements. In particular, each pixel of a depth map is represented by a mixture of Gaussian inverse-depth models. Consecutive frames are related to each other by transformations obtained from visual odometry. The result provides a more accurate representation than alternative image space depth map fusion techniques at a lower computational cost.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1A:
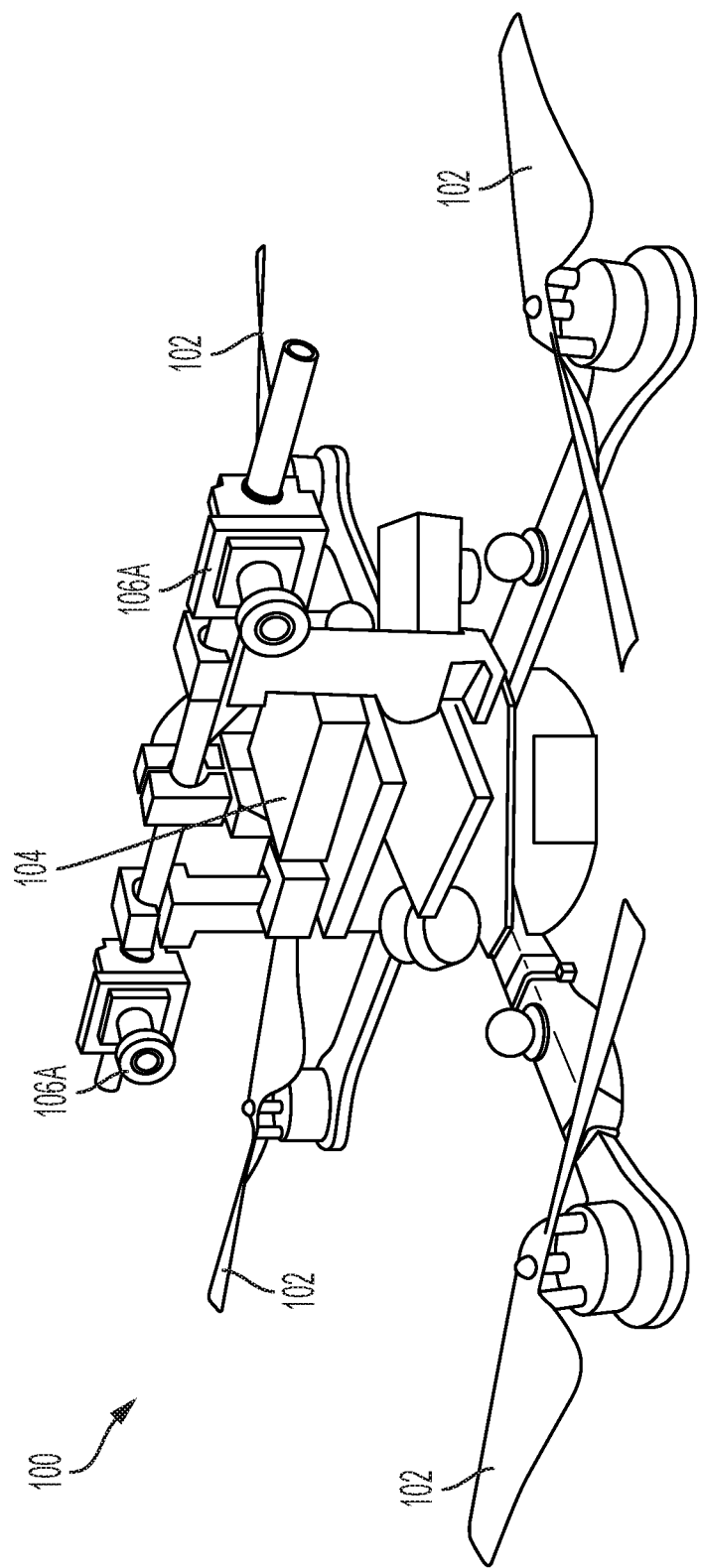
FIGS. 1A and 1B illustrate exemplary micro-air-vehicles that may be used in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a pipeline for avoiding obstacles at high speeds, using an arbitrary suite or range sensors, for robotic aircraft ("unmanned aerial vehicles") that satisfy the "configuration flat" property (see below), including those of a small, portable size known as micro air vehicles (MAVs). Embodiments may be utilized in/by aircraft of the multirotor family, which include the widely available quadcopter platform (also referred to as a "quadrotor" or, colloquially, as a "drone"). Embodiments may be utilized in/by aircraft of the fixed-wing family, which includes airplane-like platforms. The ability to fly UAVs reliably and autonomously among obstacles without a pilot is of intense commercial and technical interest and has so far been elusive, but is provided by embodiments of the invention along with verifiable performance guarantees.

Embodiments of the invention are not restricted to a particular hardware implementation, but is more-or-less equipped for a specific realization without much further specialization, in which a suite of range sensors that measure distance to nearby obstacles (that can include stereo or monocular camera systems, laser ranging systems, or ultrasound and infrared proximity sensors) is arranged on a quadcopter to provide the coverage of the environment around it. An onboard computer receives the raw obstacle data and arranges it into a very compact and efficient data structure with indexing that naturally generates a favorable resolution pattern for obstacle sensing (the "egospace"). While embodiments may enjoy the same basic properties, egospace can also be tailored to an anticipated environment or mission. Takeoff and landing scenarios in cluttered environments, constant altitude flight, or corridor/path following missions, for example, each have an optimal egospace representation and are described herein. This structure is much simpler and more compact that prior obstacle detection and representation schemes, and allows for a simple collision-checking routine that takes into account the finite size of the vehicle and evaluates potential routes through obstacles much more quickly than in alternative schemes.

Further, once the obstacle data is available, the obstacle avoidance pipeline calculates the inputs that need to be sent to a quadcopter's motors, which selectively turn propellers, or a fixed-wing aircraft's motors, which selectively turn propellers and deflect aerodynamic control surfaces to fly and execute the obstacle avoidance behavior. This portion of the pipeline, called "motion planning", can be performed at varying levels of fidelity to the actual behavior of the vehicle, and is equipped with a number of performance guarantees regarding the possibility of collisions, and the ability of the vehicle to reach its destination. Short trajectory segments that reflect vehicle maneuvers at the specified level of dynamic accuracy, called "motion primitives", are expressed directly in egospace coordinates and used to link points in space to form a path. This process has the advantage of directly expressing vehicle commands in the same coordinates in which obstacle information was acquired, which greatly decreases the number of operations required to calculate and execute a plan and allows for higher speeds. If this process is performed according to the criteria specified herein, the pipeline can guarantee that the vehicle will reach its destination without a collision, if such a path exists, as the resolution becomes finer.

Hardware Environment Details

Figure 1B:
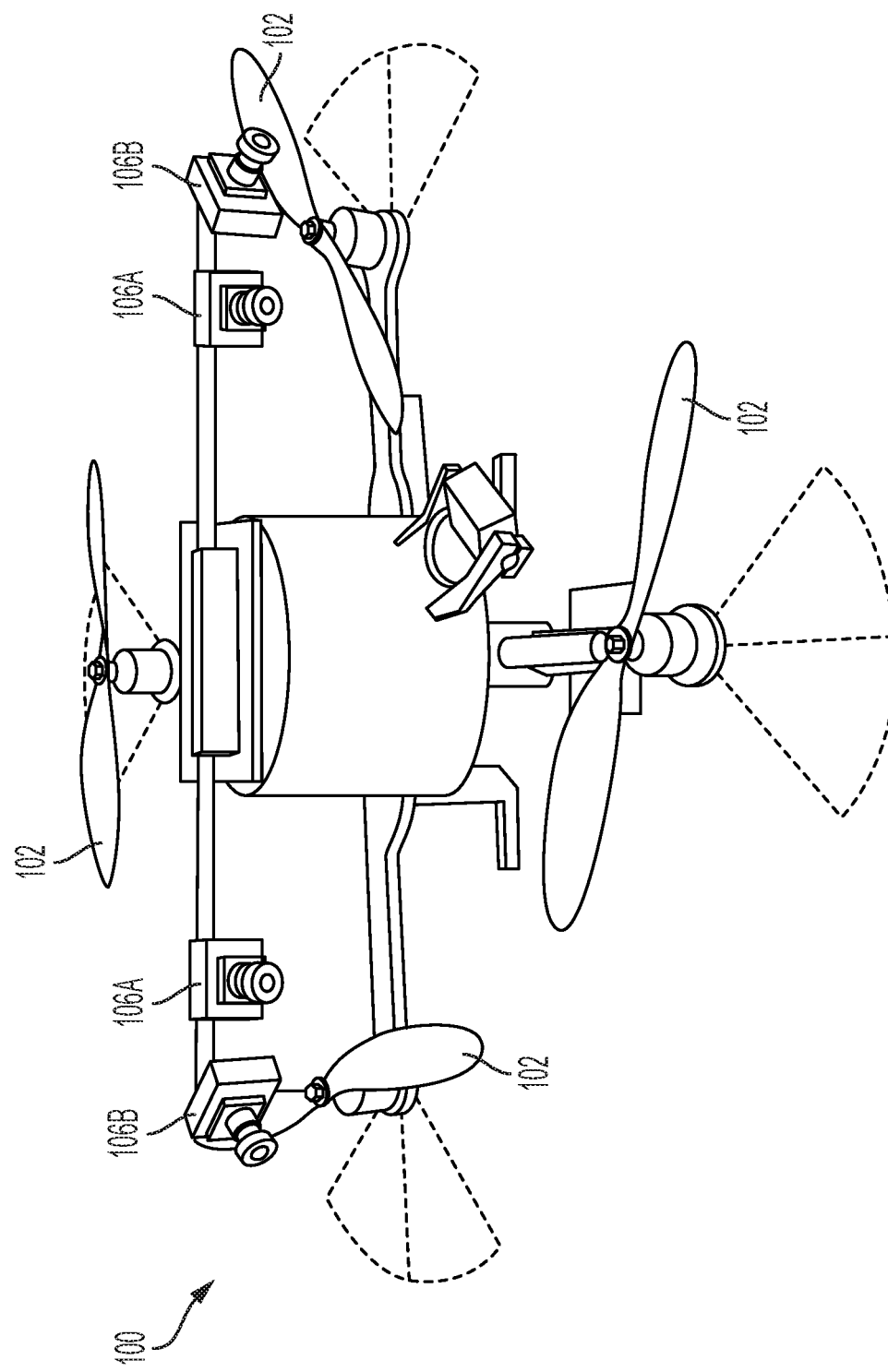

FIGS. 1A and 1B illustrate exemplary micro-air-vehicles that may be used in accordance with one or more embodiments of the invention. While specific examples are illustrated in FIGS. 1A and 1B, embodiments of the invention are not limited to a particular MAV or configuration. FIG. 1A illustrates a quadcopter MAV 100 (e.g., an ASTEC HUMMINGBRID) that is equipped with four (4) rotors 102, a flight computer 104 (e.g., ODROID XU4), that hosts a cell phone based system on a chip (SoC) (e.g., an 8 core EXYNOS5422 system). A stereo camera setup uses two cameras 106A (e.g., MATRIX VISION BLUEFOX-MLC200wG cameras [752×480, gray scale]) that are hardware synchronized. Software on MAV 100 may be running on-board the flight computer 104 using a module (e.g., ROS) for message passing. The vision pipeline including stereo processing, projections onto an egocylinder, and C-space expansion may be executed at 5 Hz with an image resolution of 384×240.

Similar to FIG. 1A, FIG. 1B illustrates a quadcopter MAV 100 (e.g., an ASCTEC PELICAN) that is equipped with four camera head (i.e., forward facing cameras 106A and side-looking cameras 106B. Thus, in addition to the two cameras 106A, embodiments may extend the total field of regard to about 180° by adding side-looking cameras 106B with structure from motion (SfM) for depth perception. Alternatively, laser scanners or any device capable of receiving point cloud information may be utilized for cameras 106. The depth data from all cameras 106 may be projected onto a cylindrical inverse range image referred to herein as an "egocylinder", and C-space expansion may be performed on the egocylinder.

As described herein, embodiments of the invention extend the concept of an "egocylinder" to an "egospace" data structure that can accommodate a general range sensor configuration. Further, basic obstacle avoidance behavior are provided in egospace coordinates, that may be extended to UAVs as part of a streamlined pipeline for motion planning in unknown, cluttered environments.

Egospace Obstacle Representation

The egospace obstacle representation is a generalization of the 2.5-dimensional "depth map" data structure that assigns, to each pixel coordinate on an image plane, a distance into the plane called "depth". In order to accommodate arbitrary sensing geometries with a field of view greater than 180 degrees, embodiments of the invention define the egospace as a parameterization of a portion of by pixel coordinates (u,v) that parameterize a set of directions (points in $S^2$) paired with a generalized depth d that is a smooth and strictly monotonic function of radius from the origin. Intuitively, egospace simply describes the location of a point by a generalized direction and distance, of which ordinary spherical coordinates is a special case.

Definition 1:

The egospace coordinates of a point x=(x,y,z) in a region $R \subseteq \mathbb{R}^3$ are curvilinear coordinates (u,v,δ) for which the egospace map (x,y,z)=ε(u,v,δ) has a nonzero and smooth Jacobian determinant and the local unit vector $e_\delta$ is parallel to the local radial unit vector $e_r$. An egospace representation of an obstacle is any surface in egospace δ=f(u,v).

The actual implementation of an egospace representation takes a form analogous to the Z-buffer of computer graphics—at each pixel, the generalized depth of the first obstacle encountered in that direction is stored. If prior map information is available, depth intervals occupied by obstacles are stored at each pixel instead. The implementation of the egospace representation also depends on the pixel parameterization and the choice of generalized depth, with a trivial realization being ordinary spherical coordinates (an "egosphere"). Similarly, the depth image realization parameterizes a sector of $S^2$ using a pinhole projection to pixels coupled with ordinary image depth Z, while the egocylinder implementation of [Brockers 2016] uses a cylindrical projection of $S^2$ about the vehicle-carried IMU origin with inverse radius 1/r.

The primary geometric advantage to egospace obstacle representations is that any parameterization by pixels will have maximal resolution near the origin, where obstacles must be dealt with immediately, that decreases with distance as it becomes less useful. Although it is possible to equip a voxel map with a variable resolution that scales well with distance and avoids excessive detail in empty space ([Hornung 2013], [Kahler 2016]), such structures are expensive to access and have significant storage overhead because they must fundamentally modify the intrinsic constant resolution (constant Jacobian) of the underlying Cartesian coordinates. Egospace, on the other hand, achieves a favorable variable resolution in a natural pattern for range sensing with simple array indexing. Stereo vision has been shown to be particularly well-suited to disparity space and egocylinder representations primarily because a limited baseline also causes sensor accuracy to decay quickly with range. The choice of generalized depth also plays an important role in partitioning resolution to best suit a sensor—inverse depth, for example, assigns points beyond the sensor horizon a finite value (zero) and extends the useful range of stereo by compressing distant obstacles, which can be detected reliably but ranged inaccurately, into a much smaller region of egospace.

The use of a radial coordinate is responsible for the compactness advantages of egospace, but as defined, it precludes, in general, smooth and invertible egospace coordinates on all of $\mathbb{R}^3$. This issue arises naturally from the geometry of range sensing and is simple to resolve in practice, but impractical to avoid in full generality. Difficulties always arise at the origin, which is projected ambiguously onto itself, as well as from the well-known geometric fact that it is impossible to parameterize $S^2$ smoothly by the two coordinates (u,v). Although these technicalities prevent a single valid egospace from covering all of $\mathbb{R}^3$, they can be sidestepped either by restricting the representation to a non-singular region of interest or by patching together multiple egospace representations to cover the entire space (for example, using two or more spherical sectors to represent all of $S^2$ or assigning the poles and origin any convenient unambiguous coordinates). One can simply exclude singularities from the definition because they can be resolved so easily in practice, and construct the egospace representation to be invertible to Cartesian coordinates and therefore able to represent any obstacle configuration in a valid region of interest.

The freedom to choose any pixel parameterization, however, provides the system designer with flexibility to accommodate any range sensor type or configuration, as well as the obstacle layout expected during a mission. The egocylinder, for example, is tailored to cluttered environments with a single dominant ground plane and limited vertical motion, while the depth image is tailored to linear scenes with a preferred direction, such as a road or corridor to be followed. A more general environment with significant vertical and horizontal motion, such as an MAV takeoff or landing amongst obstacles, would be best treated using an egosphere to provide coverage of all possible flight paths in a cluttered area. Egospace coordinates can be fixed to external references, such as the local gravity vector, the normal vector of the terrain below the vehicle, or a compass direction, and can also be placed or carried arbitrarily in the world in a fixed or moving frame. In addition to the external reference, multiple range sensors can also be fused into egospace, with overlap, to greatly enhance the robustness of the entire sensing suite. This property is particularly useful for monocular vision, which must be initialized and then tracked continuously to remove a scale ambiguity and produce unambiguous depth data—in the event of a tracking failure or dropped frame, scale can be reinitialized immediately by comparison to intact depth data in regions of overlap with other sensors.

Egospace also admits an efficient collision-checking approximation for finite-sized vehicles first introduced for disparity image representations in [Matthies 2014]. To simplify collision checking and motion planning, the vehicle is modeled as a sphere with a characteristic radius and abstracted to a point mass by expanding the apparent size of obstacles directly in egospace. After first expanding a point in world space to a sphere with radius equal to that of the vehicle, the sphere is replaced by the rectangular region in egospace, at constant generalized depth, that just occludes the sphere from view. By insisting on a rectangular expansion (that is, a region in the egospace representation bounded by lines on which either u or v are constant), the entire expansion method is divided into separate horizontal and vertical expansions that are performed consecutively for speed. For a general incompressible obstacle configuration in which every data point in a structure must be evaluated and expanded, the cost of visiting each pixel or voxel is compounded by the cost of a depth or occupancy update of all points within the expansion radius. When performed consecutively in each dimension, this cost is dependent on the precision of the representation and scales with the width in pixels M of an egospace representation or the typically much larger size of a voxel map N. Accordingly, the egospace expansion method is $O(M^3)$ and enjoys a complexity advantage over a voxel map, for which an expansion that visits and expands every voxel would be $O(N^4)$.

Figure 2:
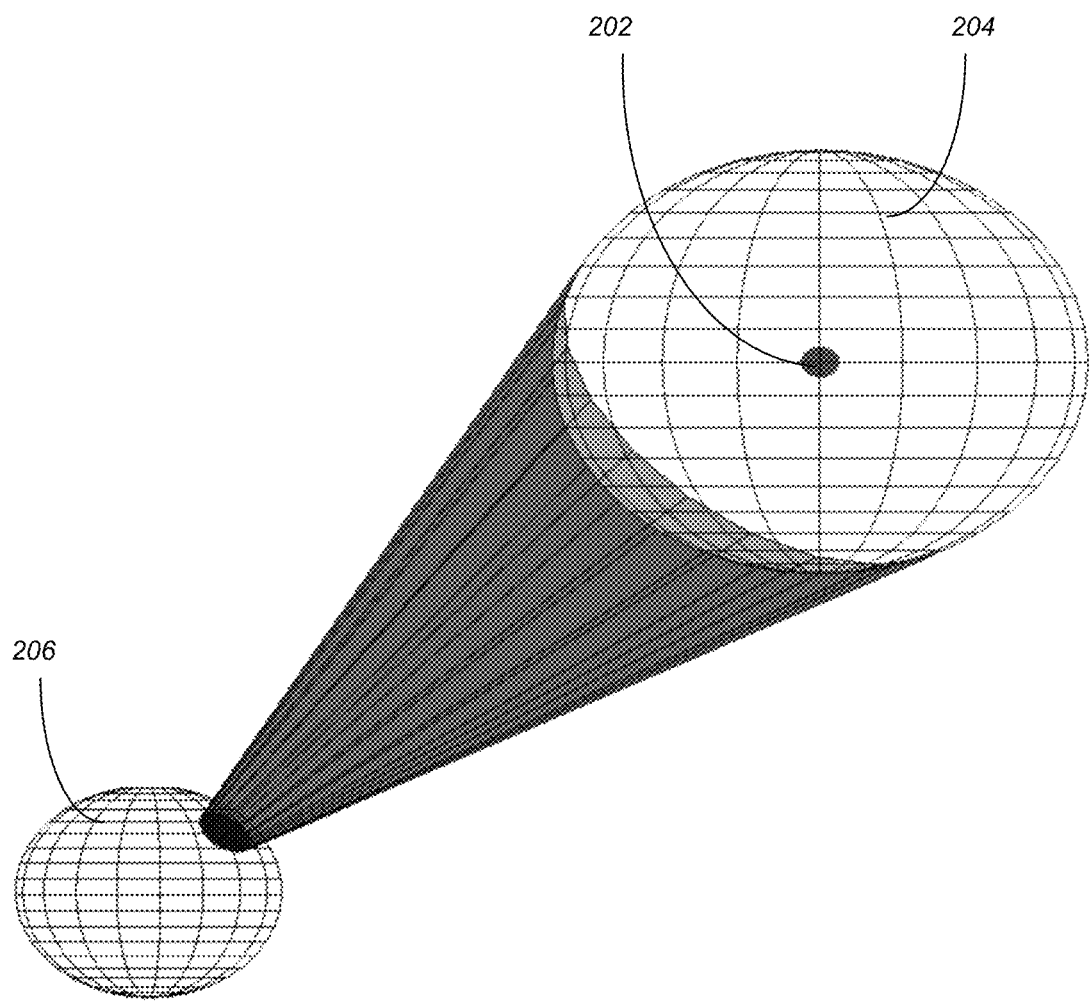
FIG. 2 illustrates the expansion of obstacles for an egospace representation based on spherical coordinates in accordance with one or more embodiments of the invention.

Although rectangular expansion is highly efficient and a useful approximation in practice, it can be difficult to process all of $S^2$ in this manner because coordinates must be chosen and patched carefully to avoid expanding points through singularities. Rectangular regions are also somewhat inconvenient for the egosphere (and, in fact, any projection surface with non-zero Gaussian curvature) because they degenerate into triangles as a pole is approached due to convergence of meridians and lose the ability to occlude the expansion sphere using separate horizontal and vertical scans. Even if a rectangle stays away from a pole, this tendency forces the consecutive 1-dimensional expansions to be excessively conservative close to the equator in order to maintain occlusion close to the poles. If the whole space must be represented, a more general approach replaces rectangles with the exact pixel region occupied by the expansion sphere in egospace, which is a circular area of known radius in egospace for a minor amount of additional computation at each pixel. Method 1 below illustrates the pseudocode for expanding obstacles on an egosphere. FIG. 2 illustrates the expansion of obstacles for an egospace representation based on spherical coordinates in accordance with one or more embodiments of the invention. As illustrated, point 202 in space is expanded by a characteristic vehicle radius (i.e., sphere 204), that is then projected onto the egospace surface (sphere 206).

Method 1

Expand obstacles on an egosphere (ordinary spherical coordinates)

Input: egospace E, vehicle radius R
for u = 1 : M do
  for v = 1 : N do
    r ← ϵ (E[u,v])
    r' ← r-R $$\gamma \leftarrow \arcsin\left(\frac{R}{\sqrt{r'^2 + R^2}}\right)$$

for i,j such that d((u,v), (i,j)) ≤ γ do
      E[i,j] ← min(r', E[i,j])
    end for
  end for
end for After the C-space expansion step and a projection, trajectories can be collision-checked immediately by comparing their generalized depth values to those of the acquired imagery—collisions occur whenever the coordinates of trajectories and obstacles coincide. Paths that extend radially from the vehicle, which arise frequently in motion planning due to visibility graph considerations, can be checked in a single operation that compares the path, which occupies a single pixel, to the generalized depth of the scene at that pixel. This advantage originates from a fundamental equivalence between egospace representations and the "tangent space" of an obstacle layout, as used by classical bug motion planning algorithms, and is exploited in embodiments of the invention for reactive obstacle avoidance.

Configuration Flatness and Egospace

Because obstacles can be represented compactly in egospace without having to construct a 3-dimensional world model, it is a natural extension of the egospace data structure to also use the same coordinates for motion planning and obstacle avoidance. The use of visual features and coordinates to plan motion has extensive precedent in visual serving and manipulation literature, including MAVs [Thomas 2014]. Other image-based motion planning schemes have used optical flow for reactive corridor-following with a quadcopter [Keshavan 2015] as well as an image-plane representation used to plan motion of a ground vehicle with negligible dynamics [Otte 2009]. Existing visual methods for UAVs do not readily accommodate a feedforward control component that can be efficiently collision-checked in advance, however, which is essential for accurate trajectory following and deliberative planning for UAVs at high speeds. Configuration flat aerial vehicle models are well-equipped to handle real-time dynamical obstacle avoidance using visual coordinates, however, because their trajectories and controls can be expressed in terms of the same configuration variables in which obstacles are represented.

Definition 2:

A robot model with state variables x, control inputs u, and state equations $\dot{x}=f(x,u)$ is called "configuration flat" if there exists a set of flat outputs $$z=\alpha(x,u,\dot{u},\ldots,u^{(k)}),$$

that are a smooth function α of the states and control inputs, smooth functions β and γ such that $$x=\beta(z,\dot{z},\ldots,z^{(j)}),$$

$$u=\gamma(z,\dot{z},\ldots,z^{(j)}),$$

and obstacle and configuration spaces O, C ⊂ {z} such that C={z}\O.

Because spatial obstacles can be expressed equivalently in $\mathbb{R}^3$ or in egospace, trajectories and controls for a configuration flat robot can also be expressed equivalently in terms of egospace coordinates.

Proposition 1:

A point-mass robot that is configuration flat in world coordinates is also configuration flat in egospace wherever the egospace map is well-defined.

Proof:

By definition of configuration flatness, all state variables x and controls u can be written uniquely in terms of the flat outputs z and their derivatives—in this case, a sufficiently smooth trajectory in world coordinates r(t) so that $$r = \alpha(x, u, \dot{u}, \ldots, u^{(k)});$$

$$x = \beta(r, \dot{r}, \ldots, r^{(j)});$$

$$u = \gamma(r, \dot{r}, \ldots, r^{(j)}):$$

Assuming that the egospace map is sufficiently smooth, one can calculate the trajectory in egospace coordinates $s(t) = \varepsilon^{-1}(r(t))$, and after inversion and composition exhibit the smooth flatness relations $$s = \varepsilon^{-1}\alpha(x, u, \dot{u}, \ldots, u^{(k)}),$$

$$x = \beta\left(\varepsilon(s), \frac{d}{dt}[\varepsilon(s)], \ldots, \frac{d}{dt^j}[\varepsilon(s)]\right),$$

$$u = \gamma\left(\varepsilon(s), \frac{d}{dt}[\varepsilon(s)], \ldots, \frac{d}{dt^j}[\varepsilon(s)]\right),$$

Configuration flat dynamics are particularly advantageous for sampling-based motion planning algorithms because only the flat outputs and their derivatives must be specified and considered for waypoint and trajectory generation. Smooth configuration flat robots also inherit the existence of time optimal trajectories between points from differential flatness [Faulwasser 2014], which greatly restricts the number of trajectories connecting two sampled points (possibly a single trajectory for certain plant models and boundary conditions) and can accommodate the extreme maneuvers that may be required to successfully evade obstacles. Although not strictly necessary, insisting on time optimality avoids the need to sample over the entire space of control inputs and also allows for any feasible trajectory to be approximated by a finite sequence of segments.

Lemma 1:

Any continuous feasible path q(t) in the flat outputs of a configuration flat robot with finite duration is arbitrarily close to a sufficiently smooth and feasible sequence of locally time-optimal segments $\{q_i^*\}$.

Proof: For a configuration flat robot, time-optimal trajectories exist between any two points in the absence of obstacles and, by construction, satisfy the vehicle dynamics and constraints. Furthermore, any sufficiently smooth sequence of locally time-optimal trajectories will also satisfy the dynamics and the constraints.

Let q(t) be any feasible trajectory in the flat outputs of a configuration flat robot on the interval $t \in [0, t_f]$. Because q(t) is continuous on the closed time interval, for any $\varepsilon > 0$, there exists $\delta > 0$ such that, for $0 < s < t_1 < t_f$, $$t_1 < \delta \Rightarrow \|q(s) - q(t_1)\| < \frac{\varepsilon}{2}. \quad (1)$$

For a configuration flat robot, there also exists a continuous time optimal trajectory $q_1^*(t)$ between q(0) and $q(t_1)$ with duration $t_1^*$ such that $0 < s^* < t_1^* \leq t_1$. Accordingly, if $t_1 < \delta$, $$\|q_1^*(s^*) - q(t_1)\| < \frac{\varepsilon}{2}. \quad (2)$$

Adding equations (1 and 2) and applying the triangle inequality gives $$t_1 < \delta \Longrightarrow \|q(s) - q_1^*(s^*)\| < \varepsilon \quad (3)$$

which implies that the time optimal segment and the non-optimal segment can be made arbitrarily close by choice of $t_i$.

The full result follows by choosing a partition $\{0, t_1, t_2, \ldots, t_f\}$ sufficiently refined such that, in each segment, $\|q(s) - q_{i+1}^*(s^*)\| < \varepsilon$ for $t_i < s < t_{i+1}$ and $0 < s^* < t_{i+1}^* < t_{i+1} - t_i$.

Combining the flat output sample space with an insistence on optimal connections allows for a resolution-complete and dynamically feasible motion planning method to be constructed from any resolution-complete method that neglects dynamics.

Theorem 1: Suppose the flat outputs of a smooth configuration flat robot with bounded inputs are sampled and connected according to any resolution-complete motion planning method without regard to dynamic feasibility. If a modified method attempts to make these connections with time-optimal trajectories and rejects any that result in a collision, then it is also resolution-complete over the vehicle dynamics.

Proof: By the preceding lemma, any feasible path from the start to the goal can also be brought arbitrarily close to a sequence of time optimal segments by decreasing the duration of the segments.

Proof, continued: The sampling and proposed connection of points is performed in a resolution-complete fashion, so in the limit of infinite resolution every sequence of sampled points—and, accordingly, every possible smooth sequence of time optimal trajectories—is evaluated by the modified algorithm. Because infeasible paths are discarded immediately and every feasible path is arbitrarily close to some sequence of time optimal segments, a feasible path to the goal must be returned by the modified method if it exists and a failure reported otherwise.

Additionally, there is never a need to leave egospace to accommodate a spatial motion planning method over configuration flat dynamics, because completeness and soundness properties always carry over from world space.

Theorem 2: Any complete spatial motion planning method is also complete in egospace coordinates wherever the egospace map is well-defined. Furthermore, if the robot is also configuration flat in world coordinates then all controls and state variables can be determined in terms of the egospace motion plan.

Proof: A complete motion planning method always returns, possibly in a probabilistic sense, a collision-free sequence of trajectory segments $\{x_i(t)\}$ between the start and goal if such a path exists. By invertibility of the egospace map, if a motion plan exists its egospace representation $\{\tilde{x}_i(t)\}$ is also collision-free, so after a composition, one may return the individual segments $\tilde{x}_i(t)$ directly and exhibit a complete motion planning method in egospace coordinates.

Proof, continued: The second hypothesis follows directly from proposition 1.

To illustrate the simplicity of this approach, embodiments of the invention provide a reactive obstacle avoidance scheme under trivial dynamics (infinite agility), which is modified to identify and accommodate the conditions under which full motion planning and configuration flat dynamics must be considered.

Reactive Obstacle Avoidance

Embodiments of the invention distinguish obstacle avoidance, in which the objective is to simply avoid collisions while not necessarily reaching a destination, from motion planning, in which the objective is to always reach the destination if possible and a completeness guarantee is required in some sense. A lightweight and successful obstacle approach that motivates an analysis is that of [Brockers 2016], in which an egocylindrical obstacle representation was used to steer a quadcopter, assumed to have infinite agility, onto collision-free radial paths through a forest towards a goal. In this section, this simple obstacle avoidance scheme is generalized to arbitrary egospace geometries and the vehicle and obstacle regimes in which an infinite agility approximation is valid are established.

Avoidance Under Infinite Agility

Because egospace always has a coordinate parallel to the radial unit vector, trajectories that extend radially from the origin occupy a single pixel location $(u_0,v_0)$ in egospace. An egospace trajectory is also, in general, collision-free if it nowhere has the same pixel coordinates and depth as an obstacle, so it follows immediately that a radial path around an obstacle can be collision-checked simply by comparing the furthest point in the path to the depth of the egospace obstacle representation at that pixel. Accordingly, an infinitely agile vehicle can navigate around obstacles and maintain a time-to-contact constraint, chosen as a design parameter to ensure a margin of safety, by scanning the pixels of egospace and choosing an appropriate target to aim at. The vehicle searches the egospace obstacle representation for the target pixel, closest to the destination, that also satisfies the time-to-contact criterion—a low-level controller then aligns the velocity vector with the chosen target (method 2). If the time-to-contact constraint cannot be satisfied after a scan, the vehicle repeats the selection process with a decreased speed.

It is clear that the simple avoidance procedure presented here is collision-free in the infinite agility limit—because time to contact with an obstacle grows without bound as speed decreases, the vehicle can always reduce its speed enough to eventually identify and turn onto a path that satisfies the time-to-contact constraint.

Method 2

---

Infinite Agility Reactive Obstacle Avoidance

Input: egospace E, depth threshold $\delta_c$,
Output: target pixel $(u_t,v_t)$
    while true do
        $d_{min} \leftarrow \infty$
        for u = 1 : M do
            for v = 1 : N do
                if E[u,v] ≥ $\delta_c$ then {for $\delta(r)$ increasing with r}
                    d ← $\sqrt{(u-u_{dest})^2 + (v-v_{dest})^2}$
                    if d < $d_{min}$ then
                        $(u_t,v_t) \leftarrow (u,v)$
                        $d_{min} \leftarrow d$
                    end if
                end if
            end for
        end for
        if $d_{min} < \infty$ then
            return $(u_t,v_t)$
        else
            $\delta_c \leftarrow \delta_c'$ {in which $\delta_c' < \delta_c$}
        end if
    end while

---

Although this approach is adequate for avoiding isolated obstacles that are sparse relative to the vehicle dynamics, on a real system collisions become possible as speeds increase and obstacles become denser. To determine the limits of validity quantitatively, embodiments of the invention evaluate ability of a quadcopter or fixed-wing aircraft, in constant speed, level flight, to follow a weaving trajectory. Assuming that the roll axis is always aligned with the velocity vector and that the only permitted acceleration is directed normal to it (to maximize agility), the simple plant model may be considered $$\dot{x} = v\cos(\theta), \tag{4a}$$

$$\dot{y} = v\sin(\theta), \tag{4b}$$

$$\dot{\theta} = \frac{g}{v}\tan(\phi), \tag{4c}$$

$$\ddot{\phi} = u, \tag{4d}$$

where v is the constant vehicle speed, $\theta$ is the heading angle, $\phi$ is the roll angle, and g is the acceleration due to gravity. The control input and roll angle are also subject to the saturation constraints $|u| \leq u_{max}$ and $|\phi| \leq \phi_{max}$, which are related to the mass, moment of inertia, and actuator limits of the vehicle and ultimately limit its agility.

Embodiments consider the ability of the vehicle to track a sinusoidal trajectory in heading, $\theta(t) = A\sin(\alpha\omega t)$, in which the parameters A and $\omega$ are estimates of maximum turn severity and frequency in a particular environment and $\alpha$ is a time scale used to compare the reference command to the saturation constraints. If the only way to satisfy the saturation constraints is to set $\alpha < 1$ at the most severe point of the trajectory, one may conclude that it cannot be tracked by the vehicle without slowing down and that the infinite agility assumption can no longer be safely made. For clarity, one can ignore the x and y dynamics, which play no role in determining the agility of the vehicle, and assume that the roll angle remains small, as is the case during level flight. Linearizing about $\phi = 0$ gives the linearized plant model $$\dot{\theta} = \frac{g}{v}\phi, \tag{5a}$$

$$\ddot{\phi} = u, \tag{5b}$$

which has two distinct tracking failure criteria in $\phi$ and u, after substituting the reference trajectory and setting $\alpha=1$:

$$v = \frac{g}{A\omega}\phi_{max} \tag{6a}$$

$$v = \frac{g}{A\omega^3}u_{max} \tag{6b}$$

Control saturation is much more sensitive to frequency and arises from an inability to roll the vehicle fast enough to track the reference—there may still be enough motor thrust to execute the turn, but the vehicle is unable to roll quickly enough to bring it to bear. Roll angle saturation, on the other hand, occurs when the vehicle can longer match the sharpness of a turn and tends to occurs first when the frequency is low but the amplitude is large.

Independently of whether or not the dynamics satisfy the tracking criteria, however, collision-free obstacle avoidance does not imply that the vehicle will always reach its destination in any environment—the vehicle can become trapped by either entering a closed loop or reducing its own velocity to zero. In the next section, the limitations of the naive scheme are remedied and complete egospace motion planning over full configuration flat dynamics is presented.

Motion Planning Over Full Dynamics

In obstacle environments that are two-dimensional and require no altitude changes to reach a destination, the infinite agility procedure can be easily made complete by also including a wall-following behavior as is done in the popular "bug" algorithms for motion planning. This solution is not entirely satisfactory for MAVs in general environments, however, because complete wall-following behavior is inefficient on a platform with limited battery life and does not easily generalize to the three dimensions. Deliberative planning in egospace is a much simpler option, and can accommodate popular approaches with all the same representation and collision-checking advantages of the reactive scheme.

Infinite-agility motion planning is readily extended to the full dynamic case through the use of motion primitives, which are trajectory segments that are precomputed either numerically or analytically. The primitives are expressed directly in egospace coordinates and simply replace the straight radial segments used in previous sections with trajectories that satisfy a more realistic vehicle model. Although trajectory generation itself can always be performed directly in egospace coordinates by integration of the state equations, the primitives described here are generated in the typically much simpler world coordinate plant model either numerically or algebraically and then projected, in advance, using the egospace map, into an egospace representation in which they are maintained. The primitives are then used to connect waypoints in egospace as part of the trajectory generation segment of any motion planning procedure, which remains valid at higher speeds with minimal extra overhead.

After modifying the infinite-agility obstacle avoidance procedure to include a completeness guarantee, embodiments of the invention introduce egospace motion primitives and combine the two to provide a general approach to the MAV motion planning problem.

Completeness Under Infinite Agility

As described above, any motion planning method that is complete in world coordinates is also complete in egospace—care must be taken, however, to properly sample points in egospace and connect them with lines properly. Selecting u and v coordinates separately from uniform distributions, for example, will not generally produce a uniform distribution of pixels (u,v) in egospace, and the equation of a linear interpolation between points in egospace will be different in general from a linear interpolation between points in Cartesian coordinates.

Figure 3A:
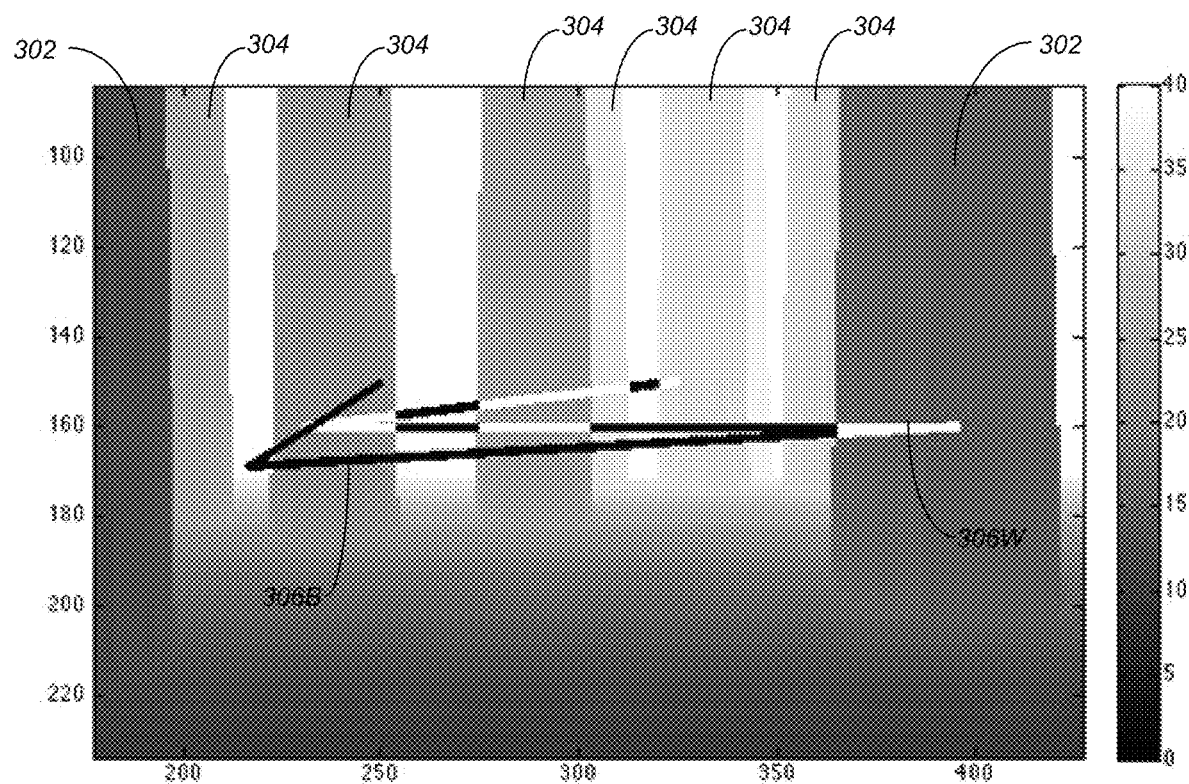
FIGS. 3A and 3B illustrate a lazy PRM motion planner implemented entirely in depth-image coordinates (FIG. 3A) for a MAV with negligible dynamics in a simulated forest environment and a world space representation (FIG. 3B) in accordance with one or more embodiments of the invention.
Figure 3B:
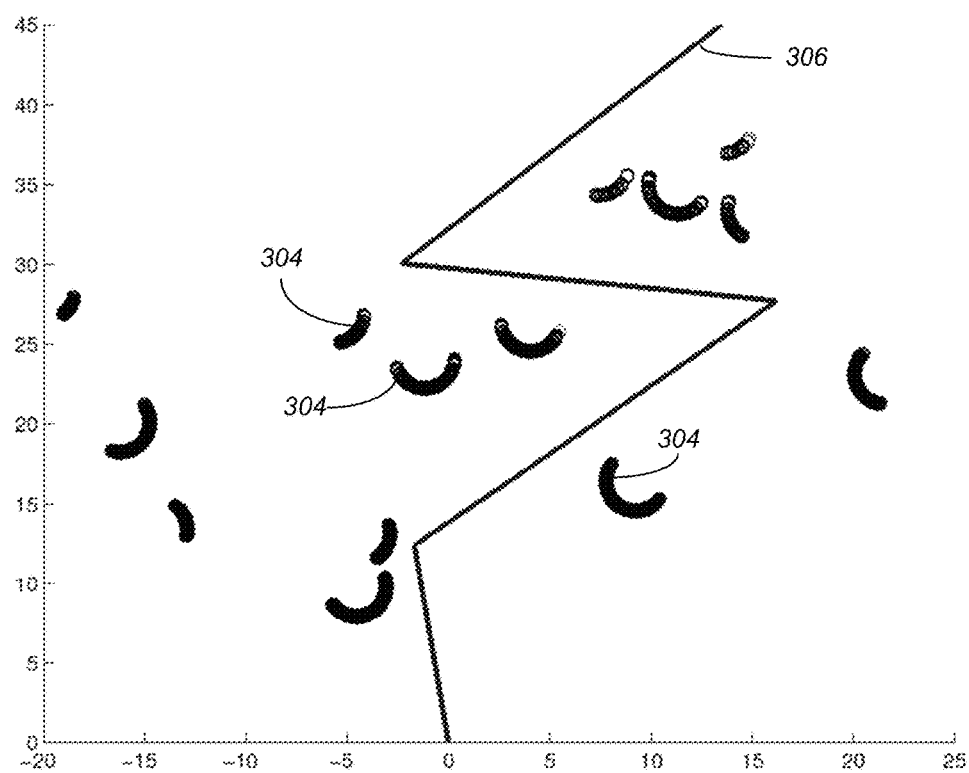

Once an appropriate sampling or point selection procedure is chosen, however, motion planning can proceed under the slight modifications suggested by theorem 1. For a sampling based method, the correct choice of a distribution in egospace immediately satisfies completeness and follows an identical procedure as in world coordinates—albeit with the more efficient collision-checking scheme by comparison. For a simulated obstacle data set, embodiments exhibit an egospace implementation of the Lazy PRM method [Bohlin 2000] generated using this approach. FIGS. 3A and 3B illustrate a lazy PRM motion planner implemented entirely in depth-image coordinates (FIG. 3A) for an MAV with negligible dynamics in a simulated forest environment and a world space representation (FIG. 3B). In the depth image, pixels with cooler colors/tones (e.g., trees 302 in the foreground) are closer than pixels with warmer colors/tones (e.g., trees 304 at the sensor horizon). Points (in embodiments of the invention) are sampled, selected and connected entirely in the egospace coordinates, for which the projected pixel coordinates of the motion plan are shown (points 306). White segments 306W of path 306 are obscured by obstacles (e.g., trees 304), but pass safely behind the obstacles 304 by a predetermined safety margin. Black segments 306B path are not obscured by the obstacles 304.

An equivalent point cloud and world-space representation is shown in FIG. 3B. in which the path/trajectory 306 avoids the obstacles 304.

Motion Primitives and Full Generality

Motion primitives for planning with aerial robots were introduced in [Frazzoli 2005] as "trim primitives" inspired by aircraft maneuvers in which one or more inputs are held at a constant value for a period of time. Embodiments of the invention continue to leverage precomputation by employing trim primitives integrated in advance and converted into egospace coordinates in which they are maintained for immediate collision-checking. For the most frequently used MAV models, the trim primitives can be readily integrated forward in closed form when inputs are constant. For both this reason and the typically increased complexity of plant models in egospace coordinates, embodiments of the invention develop the set of trim primitives explicitly terms of the initial vehicle state, the constant input value, and the final vehicle state and then convert into egospace coordinates to produce a set to be used online for motion planning. This strategy also allows for the simultaneous use of primitives in world coordinates elsewhere to simplify low-level vehicle control—state estimation, hardware inputs, and mission-level objectives are all measured or expressed most conveniently in terms of world coordinates, for example, and can immediately use the set of world primitives without a pass through the projection function, while obstacle avoidance and motion planning can use egospace primitives that are more convenient to collision check.

As a simple example, the set of egospace trim primitives for a simplified quadcopter model may be exhibited, based on a Dubins car, that remains torsion-free but can be constrained to any plane in $\mathbb{R}^3$ rather than just the x-y plane. In addition to being much simpler than the Dubins airplane generalization of [Chitsaz 2008], this "Dubins helicopter" abstraction is more appropriate for the multicopter platforms that have come to dominate research in MAV autonomy—unlike the Dubins airplane, which must maintain a predetermined groundspeed and can only climb using helical maneuvers, the Dubins helicopter model allows for purely vertical ascents as well as a flexible groundspeed that can equal zero without disrupting trajectory generation. Dubins helicopter trajectories, which are also configuration flat in position (x,y,z), are defined by a starting point $r_0$ with an initial velocity vector $v_0$ and destination $X_f$ that together determine a unit normal vector $n = (v_0 \times x_f)/\|v_0 \times x_f\|$ to the plane in which the trajectories lie. Using the planar assumption and the Rodrigues rotation formula gives the simple Dubins helicopter plant model $$\dot{x} = v_{x0}\cos(\theta) + (b_x)\sin(\theta), \quad (7a)$$

$$\dot{y} = v_{y0}\cos(\theta) + (b_y)\sin(\theta), \quad (7b)$$

$$\dot{z} = v_{z0}\cos(\theta) + (b_z)\sin(\theta), \quad (7c)$$

$$\dot{\theta} = u_\theta, \quad (7d)$$

where $(v_{x0}, v_{y0}, v_{z0})$ are the constant components of the initial velocity vector $v_0$, $(b_x, b_y, b_z)$ are the constant components of the vector $b = n \times v_0$, and $|u_\theta|$ is limited to a maximum value k. In addition to having available all the analytic advantages of the regular Dubins car, the Dubins helicopter plant model also always has $\theta = 0$ at $t = 0$ to match the specified initial velocity. Setting the control input u either off and equal zero or on at a constant value and integrating produces two distinct classes of trim primitives: straight-line trajectories, which include straight and level flight as well as pure climbs and descents, and circular turns that are either level or include a climbing component (at its most extreme, a full vertical loop) depending on n. It also follows immediately from the Pontryagin minimum principle that if the control inputs are allowed to saturate, any time-optimal path between two points in space must be made up of a combination of these two primitives. The primitives, expressed in terms of a general initial vehicle state, are projected into egospace to replace the straight line trajectory segments proposed in the previous section.

TABLE I

DUBINS HELICOPTER TRIM PRIMITIVES IN CARTESIAN (x,y,z) COORDINATES.

| | (x,y,z) |
|---|---|
| Straight Line ($u_\theta \equiv 0$) | $x(t) = x_0 + v_{x0}t$ <br> $y(t) = y_0 + v_{y0}t$ <br> $z(t) = z_0 + v_{z0}t$ |
| Circular Turn ($u_\theta \equiv \pm k$) | $x(t) = x_0 + \dfrac{v_{x0}\sin(kt) \pm b_x(1-\cos(kt))}{k}$ <br><br> $y(t) = y_0 + \dfrac{v_{y0}\sin(kt) \pm b_y(1-\cos(kt))}{k}$ <br><br> $z(t) = z_0 + \dfrac{v_{z0}\sin(kt) \pm b_z(1-\cos(kt))}{k}$ |

TABLE II

DUBINS HELICOPTER TRIM PRIMITIVES IN DEPTH IMAGE (u,v,Z) COORDINATES.

| | (u,v,Z) |
|---|---|
| Straight Line ($u_\theta \equiv 0$) | $u(t) = f\dfrac{x_0 + v_{x0}t}{y_0 + v_{y0}t}$ <br><br> $v(t) = f\dfrac{z_0 + v_{z0}t}{y_0 + v_{y0}t}$ <br><br> $Z(t) = y_0 + v_{y0}t$ |
| Circular Turn ($u_\theta \equiv \pm k$) | $u(t) = f\dfrac{kx_0 + v_{x0}\sin(kt) \pm b_x(1-\cos(kt))}{ky_0 + v_{y0}\sin(kt) \pm b_y(1-\cos(kt))}$ |

TABLE II-continued

DUBINS HELICOPTER TRIM PRIMITIVES IN DEPTH IMAGE (u,v,Z) COORDINATES.

| (u,v,Z) |
|---|
| $v(t) = f\dfrac{kz_0 + v_{z0}\sin(kt) \pm b_z(1-\cos(kt))}{ky_0 + v_{y0}\sin(kt) \pm b_y(1-\cos(kt))}$ |
| $Z(t) = y_0 + \dfrac{v_{y0}\sin(kt) \pm b_y(1-\cos(kt))}{k}$ |

The primitives are linked to form trajectories by enforcing smooth transitions, that determine the initial state of each primitive, and solving for durations. Instead of attempting to connect points with straight lines as in a kinematic motion planning algorithm, dynamically feasible paths can be generated from primitives and are used to explore the space. If this is done according to conditions of theorems 1 and 2 (that is, the primitives allow for control saturation), this substitution allows for resolution-complete motion planning that simultaneously satisfies the vehicle's dynamics and control constraints.

Figure 4A:
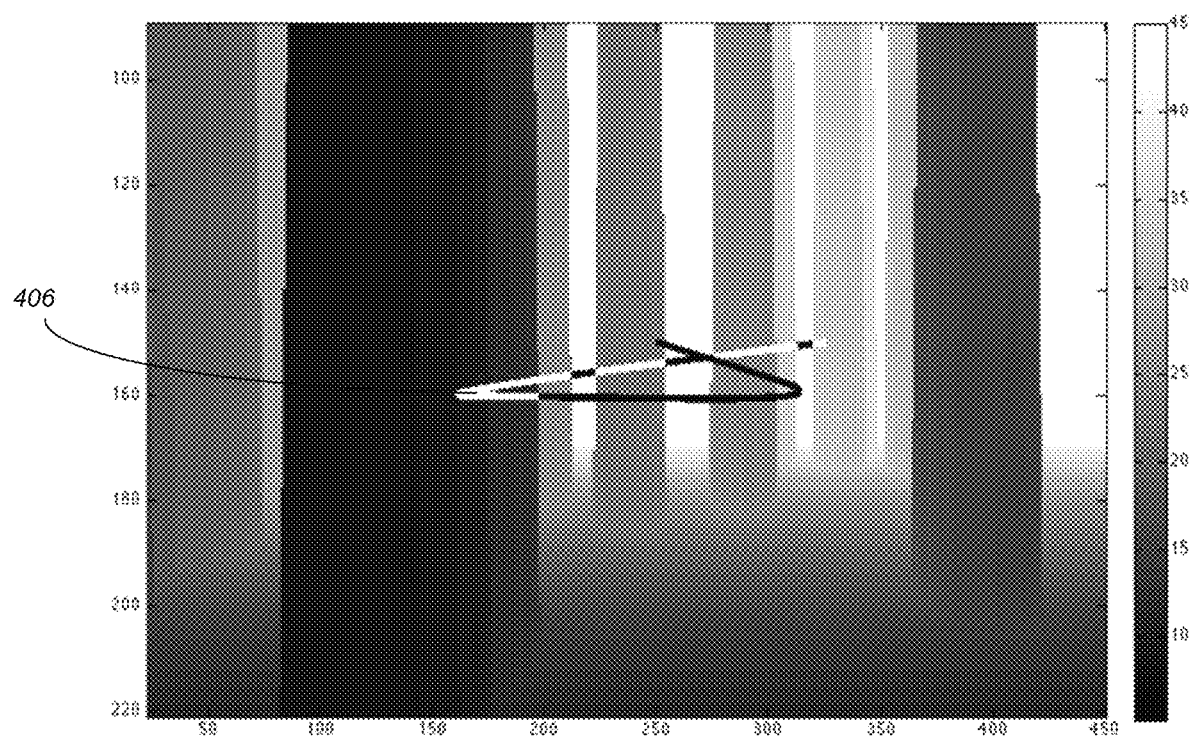
FIG. 4A illustrates an egospace Lazy PRM method adapted to Dubins helicopter dynamics by replacing straight-line segments in egospace with the equivalent projected 3D torsion-free Dubins motion primitives in accordance with one or more embodiments of the invention.
Figure 4B:
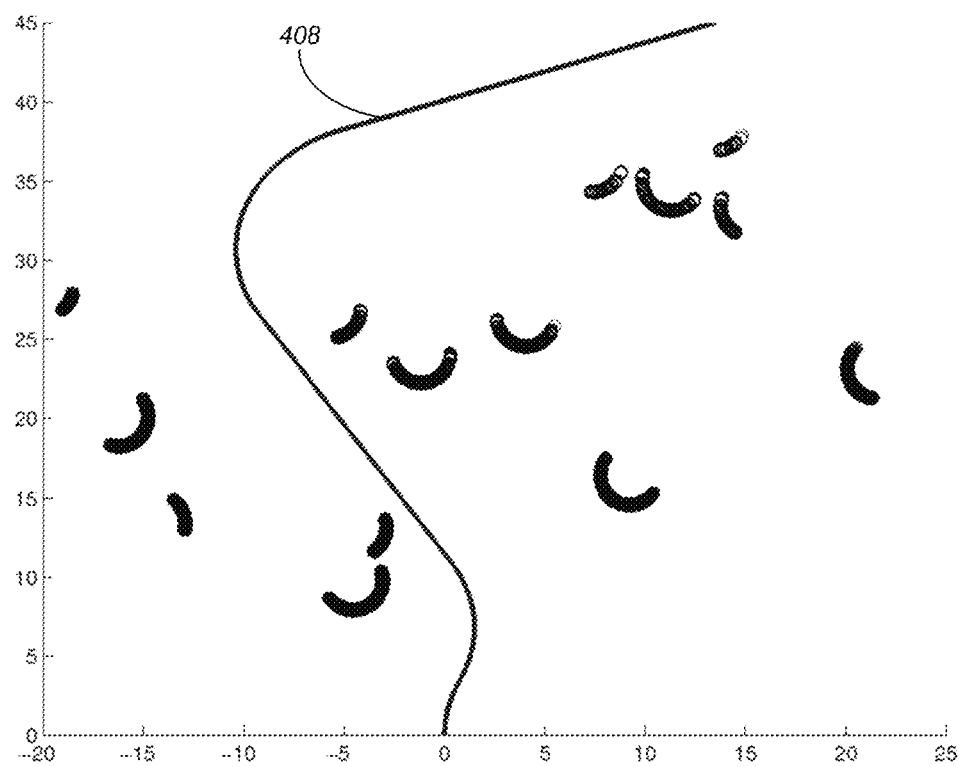
FIG. 4B illustrates a world space based point cloud and feasible path equivalent to that illustrated in FIG. 4A in accordance with one or more embodiments of the invention.

In FIGS. 4A and 4B, embodiments of the invention adapt the lazy egospace PRM of the previous section to use Dubins helicopter primitives, that can be found algebraically in advance in terms of the destination in egospace as well as the initial vehicle state and simply concatenated smoothly online. The egospace representation of the motion primitives can also be substituted into the reactive method described above if high-speed obstacle avoidance, rather than a complete motion planning method, is adequate for the needs of a mission. In other word s, FIG. 4A illustrates an egospace Lazy PRM method adapted to Dubins helicopter dynamics by replacing straight-line segments in egospace with the equivalent projected 3D torsion-free Dubins paths 406 (FIG. 4A), with the equivalent point cloud and feasible path 408 in world space (FIG. 4B).

Vehicle Control Logical Flow

Figure 5:
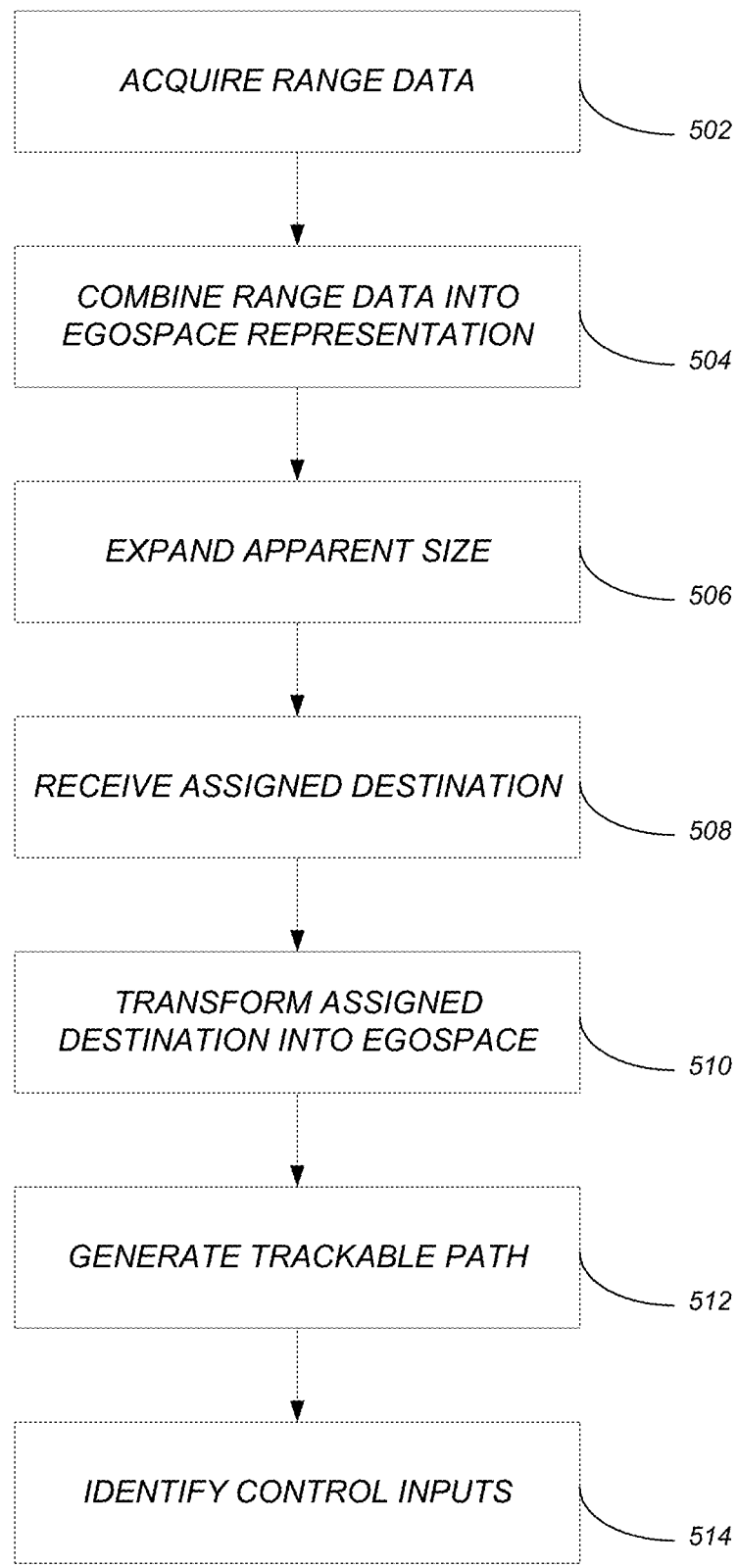
FIG. 5 illustrates the logical flow for controlling a configuration flat vehicle (CFV) to avoid obstacle collision in accordance with one or more embodiments of the invention.

FIG. 5 illustrates the logical flow for controlling an unmanned aerial vehicle (UAV) to avoid obstacle collision in accordance with one or more embodiments of the invention.

At step 502, range data of a real-world scene is acquired using range sensors. The range data includes/consists of depth data to one or more visible objects.

At step 504, the range data is combined into an egospace representation that includes one or more pixels in egospace. Egospace defines/consists of a coordinate system. For each of the pixels of the egospace representation, a value may be assigned that uniquely encodes a distance to one or more of the visible object from a defined focal point. The defined focal point may be located at an arbitrary origin.

At step 506, an apparent size of each of the visible objects is expanded based on a dimension of the UAV.

At step 508, an assigned destination in the real-world scene is received (that is based on world space).

At step 510, the assigned destination is transformed into egospace coordinates in egospace.

At step 512, a trackable path is generated from the UAV to the assigned destination through egospace that avoids collision with the visible objects based on the expanded apparent sizes of each of the visible objects. The trackable path may be generated by generating one or more predefine maneuvers simultaneously in egospace and world space, followed by the selecting and linking the predefined maneuvers to generate the trackable path.

Further, the trackable path may be generated by generating one or more waypoints (in egospace), and searching for a sequence of waypoints that define the trackable path, wherein the searching includes comparing the depth of the visible objects to egospace coordinates of the waypoints to determine whether the waypoints and segments connecting the waypoints are valid. Such searching may be performed dynamically on the fly (e.g., in real-time) on board the UAV.

The trackable path may also be generated based on an acceptable time to contact. In particular, an acceptable time to contact is determined. A check is then made to determine if the assigned destination in egospace is collision free within the acceptable time to contact. The checking converts the acceptable time to contact to an acceptable depth value, and compares the acceptable depth value against a depth value corresponding to one of the visible objects that occlude the assigned destination. The check is repeated for each of the pixels of/in the egospace representation. One of the pixels in the egospace representation that is collision free is selected as a target. A velocity vector of the UAV is then configured such that the velocity vector of the UAV aligns with the target.

At step 514, inputs that control the CFV model to follow the trackable path are identified/generated and used to control the UAV.

Gaussian Mixture Models for Temporal Depth Fusion

Sensing the 3D environment of a moving robot is essential for collision avoidance. Most 3D sensors produce dense depth maps, which are subject to imperfections due to various environmental factors. Temporal fusion of depth maps is crucial to overcome those. Temporal fusion is traditionally done in 3D space with voxel data structures, but it can be approached by temporal fusion in image space, with potential benefits in reduced memory and computational cost for applications like reactive collision avoidance for micro air vehicles. Embodiments of the invention present an efficient Gaussian Mixture Models based depth map fusion approach, introducing an online update scheme for dense representations. The environment is modeled from an egocentric point of view, where each pixel is represented by a mixture of Gaussian inverse-depth models. Consecutive frames are related to each other by transformations obtained from visual odometry. This approach achieves better accuracy than alternative image space depth map fusion techniques at lower computational cost.

Introduction

Depth perception is fundamental to most approaches to obstacle detection for robotic vehicles, and reliable obstacle detection is particularly challenging for small micro air vehicles, which are the main application focus here. Significant research has been devoted to dense depth perception with stereo matching (see [Scharstein 2002], [Scharstein 2014], and [Geiger 2012]) and active sensors, such as MICROSOFT KINECT, INTEL REALSENSE, and Time-of-Flight cameras. Despite this, depth map errors are still frequent, generally due to the presence of non-Lambertian surfaces, textureless regions, changes in lighting that have uneven effects on the scene, and inherent range limitations of active depth sensors. Obstacle detection errors—false alarms and missed detections—are inevitable if detection is only done with instantaneous frames of depth data.

Figure 6:
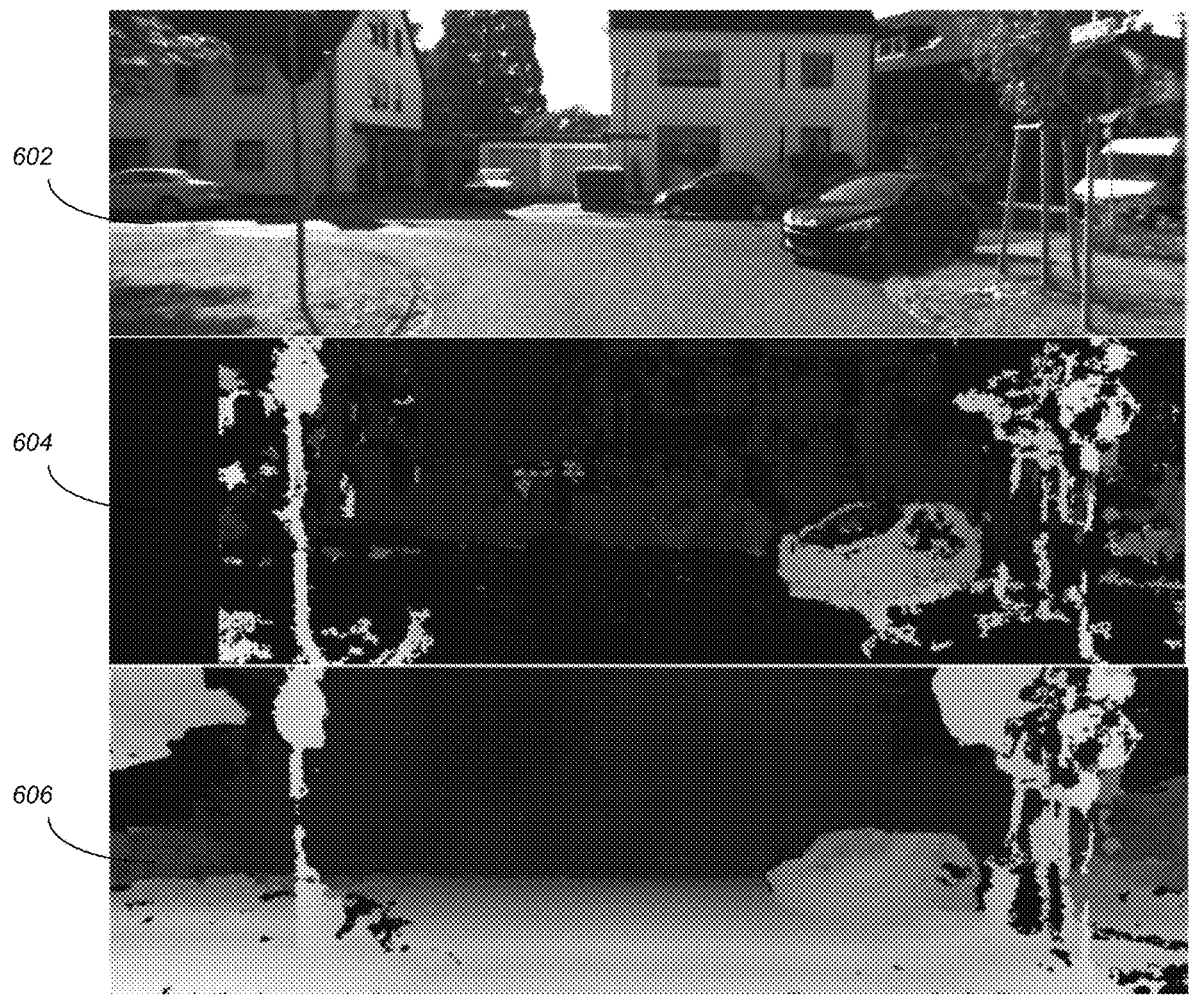
FIG. 6 illustrates a gray-scale left image, an initial disparity map via Semi Global matching, and a temporally fused disparity map in accordance with one or more embodiments of the invention.

Such errors can be reduced by temporal fusion. In the robotics literature, temporal fusion in 3D space with occupancy grid or voxel data structures has been a standard approach (see [Hornung 2013], [Cole 2006], and [Dryanovski 2010]. However, temporal fusion can also be done in image space. FIG. 6 illustrates a gray-scale left image 602, an initial disparity map via Semi Global matching 604, and a temporally fused disparity map 606. The temporal fusion compensates flickers, unreliable disparity estimates, and empty pixels for a denser representation of the surrounding. The use of temporal fusion enables a reduction in obstacle detection error rates at lower computational cost, particularly for reactive navigation in cluttered environments. With inverse range as the depth parameterization, image space temporal fusion also avoids problems with defining appropriate 3D map cell sizes when the uncertainty of depth measurements is a strong function of the true depth, as is the case for many sensors. Image space fusion could also be a useful front end to quickly filter inconsistent depth measurements before creating a 3D world model.

The research on depth enhancement has mostly focused on spatial enhancement such as joint depth-color filtering (see [Doson 2010], [Yang 2007], [Park 2011], and [Ferstl 2013]) and up-scaling (see [Liu 2013], [Schneider 2016], [Lu 2015], [Matsuo 2015], and [Min 2012]); while temporal enhancement has been given much less attention. The large literature of simultaneous localization and mapping (SLAM) can be considered a way of fusing temporal data in order to generate a representation of an environment. However, the sparse representation of these techniques is not appropriate for path planning and collision avoidance that require denser representation ([Schmid 2013] and [Matthies 2014]). The multi-view 3D extraction techniques can be adapted to temporal domain by assigning consecutive frames as multiple observations of a scene. This approach can provide temporal consistency while demanding high computational power due to use of multiple 3D warping.

In embodiments of the invention, an efficient depth data fusion technique is used to provide temporally consistent models for path planning and collision avoidance for ground vehicles or micro air vehicles. The solution is inspired by a background modeling framework for surveillance image change detection, where each pixel is represented as a mixture of Gaussian distributions. This compact depth map representation is propagated between frames by forward warping, using platform ego motion estimates, and is updated at each time step using newly observed depth maps. The depth maps can be provided by an active sensor, stereo matching or structure from motion.

The remainder of this portion of the invention is organized as follows. The next section summarizes prior work related on temporal fusion. Thereafter, a description of the details of the proposed approach, followed by experimental results and comparison to other methods are described.

Related Work

Temporal fusion of depth data can be classified into three categories. The first group integrates temporal consistency in the cost function during the extraction of 3D. [Zhang 2009] exploits Markov Random Fields constructed on multiple consecutive frames. The independently extracted depth maps are merged through bundle optimization resulting in high computational complexity. In [Pizzoli 2014] monocular dense reconstruction is proposed by describing each pixel as a parametric model to extract depth maps from a multi-view stereo point of view. The approach presented in [Pizzoli 2014] differs from traditional multi-view stereo techniques by introducing online and sequentially updated depth maps. In [Richardt 2010], [Hosni 2011], and [Pham 2012], local edge-aware filters over temporally aggregated cost functions are utilized to determine the depth maps. The SLAM literature, while using sparse representation, exploits online depth updates especially in the key frames. In [Foster 2014], the sparse depth measurements are modeled as a weighted sum of Gaussian and uniform distributions corresponding to inlier and outliers, and the depth search is performed along a restricted region in the epipolar line. On the other hand, in [Engel 2013] a simple Gaussian model is utilized to model depth measurements and the depth search is limited within the standard deviation of the prior hypothesis. The depth update is achieved by multiplications of two distributions as in the Kalman filter update step. This approach is extended to large scale direct SLAM with the addition of stereo cameras in [Engel 2015], where stereo matching is exploited to adjust the monocular scale and increase the number of reliable points. In SLAM techniques, occluded pixels are eliminated from the model according to the variance of the depth values.

The second group relies on the utilization of 3D models, such as voxels or surfaces, to fuse depth data. KinectFusion [Newcombe 2011] gets the depth maps from KINECT camera with active sensors and these maps are merged through signed distance functions to efficiently represent the 3D surfaces. In RGB-D Fusion [Or-El 2015], the depth and color data captured from RGB-D sensors are merged to increase accuracy of the 3D models. These approaches exploit high power GPUs to meet high precision and real-time requirements. They are generally applicable to indoor 3D model reconstruction that limits the scope of path planning and collision avoidance. In [Song 2015], the raw depth values gathered from active sensors are improved via median filter among nearby frames in a time window.

The final group involves techniques that approach the temporal fusion problem in a post-processing or filtering framework. [Merrel 2007] proposes a visibility based approach to fuse multiple depth maps into a single depth map. This method requires multiple 3D warping and depth ordering steps for each frame that increases the memory and computation requirement. The resulting depth maps still include noise, since visibility is constrained for each frame independently without any global regularization. In [Hane 2011], depth maps are integrated into a volumetric occupancy grid. Two level height maps are exploited to constrain the motion of a robot in an indoor environment. The regularization is achieved through anisotropic total variation with reduced dimension due to indoor constraints. In [Rumpler 2013], depth estimates of consecutive frames are merged by a probabilistically motivated 3D filtering approach. Each frame receives multiple depth candidates from the preceding frames and the depth assignment is achieved by maximization over the local histogram of mean-shift filtered depth values. This merging step is followed by photometric edge-aware filtering and mesh generation to fill the holes in the depth maps. [Matyunin 2011] utilizes a median filter over consecutive frames to smooth out the noisy measurements then averages the depth values according to the motion estimation between color images and interframe differences. In [Min 2012], optical flow and patch similarity measures are exploited to up-scale low resolution ToF cameras with respect to high resolution color images and provide temporal consistency. [Unger 2011] projects multiple depth hypotheses to a reference view and estimates probability density function via projection uncertainties. The depth candidate with highest probability is assigned to the corresponding pixel. Recently, [Ntouskos 2016] proposes a total generalized variation technique to fuse depth maps from multiple frames. The optimization is executed on a 2.5 D surface obtained by backprojecting the depth maps.

It is important to note that using multiple 3D warpings (back-projection and projection) or optical flow are the two alternatives for data registration for the techniques that consider fusion as a filtering framework. This is a limiting factor in terms of memory and computational complexity for onboard processing. Even the median filter that is a common approach to remove outliers requires high computation. In addition, multi-view techniques suffer from holes created during forward mapping as the motion between frames increases.

In order to provide temporally consistent disparity maps and denser representation for collision avoidance and path planning, embodiments of the invention provide a sequential depth map filtering approach where each pixel is considered as a mixture of Gaussian models. The problem may be considered from an egocentric point of view by only considering the current field of view and ignoring the previously visited out-of-view regions. This compact representation yields an efficient solution to address the trade-off between computational complexity and accuracy. GMMs are projected onto the most recent frame with respect to pose estimates gathered from a SLAM framework. Hence, only the pose change between the recent two frames is exploited, which reduces the required number of 3D warpings tremendously. The Gaussian models are updated efficiently with the current depth map observation. This approach unites and extends the efficiency of sparse depth model updates in the SLAM literature with dense representation of multiview stereo. The use of Gaussian mixtures enables modeling partially occluded pixels due to robot's egomotion or independently moving objects in the scene.

GMM Based Temporal Fusion

Use of Gaussian Mixture Models (GMM) is a common technique to perform background/foreground segmentation for detecting moving objects in surveillance video [Stauffer 1999]. This approach combines sequential observations of a pixel (intensity) in a compact representation. The same idea can be extended to represent the environment on a moving platform. This is closely related, but not identical to, formulations that would result from a strict recursive state estimation derivation.

3D sensors produce depth maps in the image domain, and are subject to errors and missing data due to many causes. Even where depth estimates are approximately correct, for many sensors the error in estimated 3D coordinates is a strong function of the true range; for example, this error is quadratic in range for triangulation-based sensors and non-linear in range for phase-based time-of-flight active optical range sensors. This nonlinear error characteristic complicates the definition and maintenance of 3D grid-based world models. Similarly, most 3D sensors have angular instantaneous fields of view (IFOV), e.g. the projected cone imaged by one pixel, which also leads to sampling issues with 3D grid-based world models. Representing uncertainty in inverse depth in image space avoids these problems. However, gross errors from several sources can lead to ambiguous depth estimation given time sequences of observations; the GMM formulation offers a compact, efficient approach to overcome this ambiguity.

Notation

Let $\vec{x}=(u,v,d)$ be the triplet defining pixel position $(u,v)$, and the disparity value, $d$, in the image domain. One may assume that, at a time instant $t$, $x$ has a mixture of $K$ Gaussian distributions as follows:

$$P(\vec{x}_t | X_T) = \sum_{m=1}^{K} w_m N(\vec{x}; \vec{\mu}_m, \vec{\sigma}_m) \qquad (8)$$

where $\vec{\mu}$'s are the mean and $\vec{\sigma}$'s are the variance estimates of the x triplet and $X_T$ is the set of observations within time frame of T from the image sequence. In typical GMM applications, each mode has a weighting factor that affects the state of the pixel. In the depth integration version of this model, embodiments exploit an occurrence counter on each mode and decide the current state with respect to occurrence and variance estimates. The variances of u and v are ignored, for the sake of efficiency, since these positions are only utilized to map points to the following frames without suffering quantization noise. Hence the variance of positions does not have a direct effect on the disparity values. Therefore, GMM is modified as follows:

$$P(\vec{x}_t|X_T) = \Sigma_{m=1}^{K} W(O_m, \sigma_m) N(\vec{x}_t; \vec{\mu}_m, \sigma_m) \quad (9)$$

where $O_m$ corresponds to the number of frames that the corresponding mode m is observed and W is a weighting function that defines the contribution of the corresponding mode w.r.t. occurrence and variance. In this study W is chosen to be an impulse function centered at the mode with lowest variance and sufficiently high occurrence count. This choice provides crisp disparity refinement and handles the mixing of background and foreground hypotheses.

Visual SLAM pose estimates between consecutive frames provide the mapping of a triplet in frame t−1, to the following frame, t, as:

$$\vec{x}_t^h = {}_{t-1}^t\theta(\vec{x}_{t-1})\vec{x}_{t-1} \quad (10)$$

where ${}_{t-1}^t\theta(\vec{x}_{t-1})$ is the 4×4 transformation matrix that maps $\vec{x}_{t-1}$ to the following frame, and $\vec{x}_t^h$ is the hypothesized model. The mapping between two consecutive frames requires an inverse projection from the image coordinates to 3D, then a transformation based on the camera motion and a re-projection.

GM Modeling

GMM based temporal fusion involves initialization, forward mapping GMM update, and disparity assignment steps. Initialization create a single mode for each pixel (x,y) as follows:

$$N(\vec{x}; \vec{\mu}_0, \sigma_0): \begin{cases} \vec{\mu}_0 = (x, y, d) \\ \sigma_0 = \sigma_{init} \\ O_0 = 1 \end{cases} \quad (11)$$

In (11), $\sigma_{init}$ is set to a high value (i.e., 6), and d is the observed disparity map at the initial frame. The initial high standard deviation indicates that the disparity value that is observed for first time is not trusted. The forward mapping step transfers models from the previous frame to the current frame and sets the valid disparity hypotheses for each pixel. Then, the update step fuses the temporally aggregated models with observation from the current disparity map. Finally, the assignment step outputs a single disparity estimate for each pixel by assessing the mixture distributions at each pixel.

Forward Mapping

At each time step, GMMs from the previous time step are mapped to the current time according to (10). This forward mapping is provided for all of the models of a pixel. Therefore, the maximum number of 3D warpings is limited by the pre-defined number of models in the mixture, K. Forward mapping may introduce some holes due to quantization and occlusions as a result of the motion of the vehicle. The size of the holes is a function of the vehicle motion between frames; for large motions, some fundamental tools of forward mapping, such as dilation-erosion and Z-buffering, are not applicable since they are utilized when the source pixels have one disparity at a time. In this case, each pixel has a different number of depth models, which results in multiple depth models in the target frame. Thus, there is not a specific disparity map for applying any post-processing. Moreover, GMM depth models are considered to store partially occluded pixels along then temporal axis, hence exploiting a Z-buffer is not attractive, because it eliminates the occluded disparity candidates.

This problem is handled by allowing the mapped triplets to influence neighboring pixels in the target frame. Since each pixel gets contributions from the neighboring pixels, this increases the number of depth hypothesis. The number of possible hypotheses is limited by the predefined number of GMMs, K. Hence, a reduction step is used that averages triplets whose disparity hypothesis are closer than a threshold, i.e. $\Delta d=3$. The averaging is performed on all parameters of GMMs as follows:

$$N(\vec{x}^h; \vec{\mu}_m, \sigma_m) = \frac{1}{P} \sum_{s \in S} N(\vec{x}_s^h; \vec{\mu}_s, \sigma_s) \quad (12)$$

where $S = \vec{x}_s^h | \vec{\mu}_m - \vec{\mu}_s | < \Delta d$ is the set of neighbor hypotheses, and $p=|S|$ is the size of the set. The reduction is finalized by picking the best K models according to their standard deviations. This approach fills quantization holes, but it may grow object boundaries. This growing is handled by the rejection step during update of GMMs, which is explained in the following sub-section.

GMM Update

As a new frame is observed (x,y,d), a comparison is conducted between the current disparity map, $\vec{x}(d)$, and the mapped GMMs from the previous frame as:

$$M = \text{argmax}_{m \in [1, K_x]} |d - \mu_m(d)| \quad (13)$$

In (13), the mode with the closest disparity model is determined among the $K_x$ prior models of the corresponding triplet. If the best match has disparity distance below a specified threshold, $T_d$, then it is considered to be a proper fit. In that case the update of GMMs, a common way for background update [Stauffer 1999], is achieved as follows:

$$\sigma_m^2 = \alpha \sigma_m^2 + (1-\alpha)|d - \vec{\mu}_M(d)|^2$$

$$\vec{\mu}_M = \alpha \vec{\mu}_M + (1-\alpha)x$$

$$O_M = O_M + 1 \quad m \in [1, K_x]$$

$$\sigma_m^2 = \sigma_m^2 + V_0$$

$$O_m = O_m - 1 \quad (14)$$

where the matched mode, M, is updated by the current observation. The remaining modes are penalized by $V_0$ (=0.5) since they do not have any observations. In addition, the occurrence counter is incremented for the matched mode, M, and decremented for the mismatched modes. The update rate, $\alpha$, is fixed at a value that balances rapid convergence with smoothing over many frames. Experiments show that this update process improves performance over prior work at lower computational cost; alternate probabilistic foundations of the update formulation may also be used. If there is no fit, all GMMs of the corresponding pixel are penalized and a new mode is included according to (11). If the number of modes is at the limit, the weakest mode (with respect to disparity variance) is replaced with the current observation. There may be no observation coming from the current disparity map; in that case, the models are not updated while the occurrence count is decreased as a forgetting factor. In order to adapt to temporal changes and preserve efficiency, modes with high occurrence counts but large disparity variances are rejected. These correspond to unreliable modes, since the variances have not decreased despite high occurrence.

Disparity Assignment

For motion planning, each pixel is assigned a final disparity estimate according to the occurrence count and the variance of the GMMs. To assign a valid disparity value, the mode that fits the most recently observed disparity must have an occurrence count larger than a threshold (i.e. $O_m>3$). This rejects temporal flickers among consecutive frames. Also, the variance estimate of the model should also be below a threshold, which enforces the assignment to be reliable ($\sigma_m<0.25\sigma_{init}$). The same conditions are valid for the empty pixels or when there is no match with the prior GMMs in the current disparity map. In this case, the best model having least disparity variance is assigned to the corresponding pixel as long as the occurrence and variance satisfy the conditions.

Computational Analysis

Before describing experimental results, a brief analysis of the computational complexity of the proposed fusion technique is provided. Common multi-view techniques where fusion is considered as a filtering problem are considered as a baseline for comparison. Neglecting the post-processing steps and additional optimizations, the comparison is based on the required number of forward mappings and the memory requirement to hold multiple hypotheses. This gives a general idea of the complexity without getting into details of additional processes. In the multi-view approach, the number of 3D warpings is at least equal to the width of the time window, given as T, and the memory requirement is T×W×H to store all possible contributions from the previous frames. On the other hand, the proposed approach requires K 3D mappings and 5K of image memory (three for triplet means (u,v,d), one for occurrence count and one for disparity variance). Single 3D mapping as given in (10) involves two projections in addition to one transformation in 3D coordinates. In the stereo camera setup, the projections are simplified by basic arithmetic operations over the camera calibration parameters. In general, 10 to 20 frames are utilized during Multiview depth fusion [Or-El 2015][Unger 2011][Ntouskos 2016], while for GMM based fusion, one to three GMMs are sufficient to provide a compact representation of the previous depth maps. Hence, there is an obvious decrease in the number of 3D forward mappings, which is a time-consuming step especially for on board processing. On the other hand, the memory requirement remains on the same scale.

Experimental Results

To evaluate the performance of the proposed approach, embodiments of the invention utilize the well-known KITTI stereo benchmark [Geiger 2012]. This provides an excellent framework to evaluate stereo matching and multi-view extensions, since it contains sets of 20 consecutive test frames, with ground truth at 11th frame; hence, fusion of the previous 10 frames is applicable to refine the target disparity map. In the first set of experiments, comparative results are given with state-of-the-art techniques in terms of computation time and depth map accuracy. Embodiments of the invention fixed the number of modes at K=3 for the proposed approach, which provides a good tradeoff between computation and accuracy. In the second set of experiments, the performance of GMM based fusion is analyzed with respect to the number of modes in the mixture and different visual odometry poses gathered from three different approaches [Geiger 2011], [Kitt 2010], and [Ntouskos 2013]. Throughout the experiments, two different stereo matching algorithms (Semi-Global Matching (SGM) [Hirschmuller 2005] and Efficient Large Scale Stereo Matching (ELAS) [Geiger 2010]) are exploited to observe the enhancement after temporal fusion. Both of the matching techniques yield sub-pixel estimates, so the disparity values after temporal fusion also have sub-pixel accuracy. The parameters for the stereo matching methods are set according to the parameter set given KITTI evaluation benchmark. The evaluation is based on the mean disparity error and the percentage of erroneous pixels with disparity error larger than a threshold, i.e., $\Delta d>3$.

Comparison with State of the Art

Embodiments of the invention selected TGV [Ntouskos 2016], PFuse [Unger 2011], DSM [Rumpler 2013], and the common median filter as the techniques to compare. In all these techniques, the problem is considered in a filtering framework, as in an approach of embodiments of the invention, where fusion is conducted with estimated disparity maps and camera poses estimated by VO. TGV is a complex optimization framework with high ranking on the KITTI test benchmark, thus it is considered as state-of-the-art in terms of accuracy. Sharing the same experimental setup, published results of TGV are quoted and results of PFuse, DSM and median filter obtained are described. Post-processing steps of these methods are not exploited in order to evaluate the fusion stage only. The tests are conducted on the KITTI stereo 2012 training set, including 194 different sequences with average resolution of 1250×350. This set has mostly static scenes, compared to the 2015 release of the benchmark that has independently moving objects at each frame. Thus, the KITTI 2012 set provides a more focused evaluation of temporal fusion.

In this set-up, visual odometry pose estimates are obtained via [Geiger 2011]. The performances of the temporal fusion algorithms over the disparity maps obtained by SGM and ELAS are given in Table III and Table IV, respectively.

TABLE III

The average disparity error and out-3 percentage performances of the temporal fusion techniques over SGM

| Err >3 | D-Avg | Out-3% | Density % |
| --- | --- | --- | --- |
| SGM [Hirschmuller 2005] | 2.9 | 13.1 | 76 |
| TGV [Ntouskos 2016] | 2.0 | 8.6 | 100 |
| PFuse [Unger 2011] | 2.5 | 11.5 | 93 |
| DSM [Rumpler 2013] | 2.6 | 12.0 | 97 |
| Median | 2.1 | 9.1 | 99 |
| Proposed | 1.8 | 7.9 | 94 |

TABLE IV

The average disparity error and out-3 percentage performances of the temporal fusion techniques over ELAS

| Err >3 | D-Avg | Out-3% | Density % |
|---|---|---|---|
| ELAS [Hirschmuller 2005] | 1.7 | 9.8 | 76 |
| TGV [Ntouskos 2016] | 1.4 | 7.3 | 100 |
| PFuse [Unger 2011] | 1.8 | 8.9 | 92 |
| DSM [Rumpler 2013] | 1.9 | 9.5 | 99 |
| Median | 1.5 | 7.2 | 99 |
| Proposed | 1.3 | 7.1 | 92 |

Figure 7:
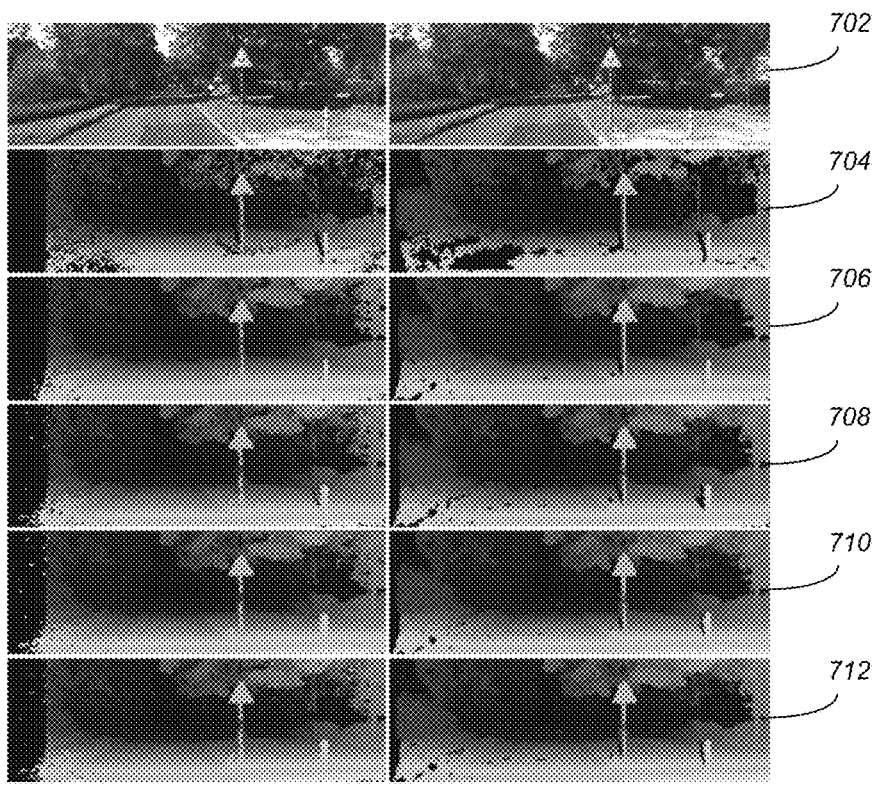
FIG. 7 illustrates a left-right stereo pair, initial disparity maps (SGM left, ELAS right), proposed approach, PFuse, DSM, and Median Filter in accordance with one or more embodiments of the invention.
Figure 8:
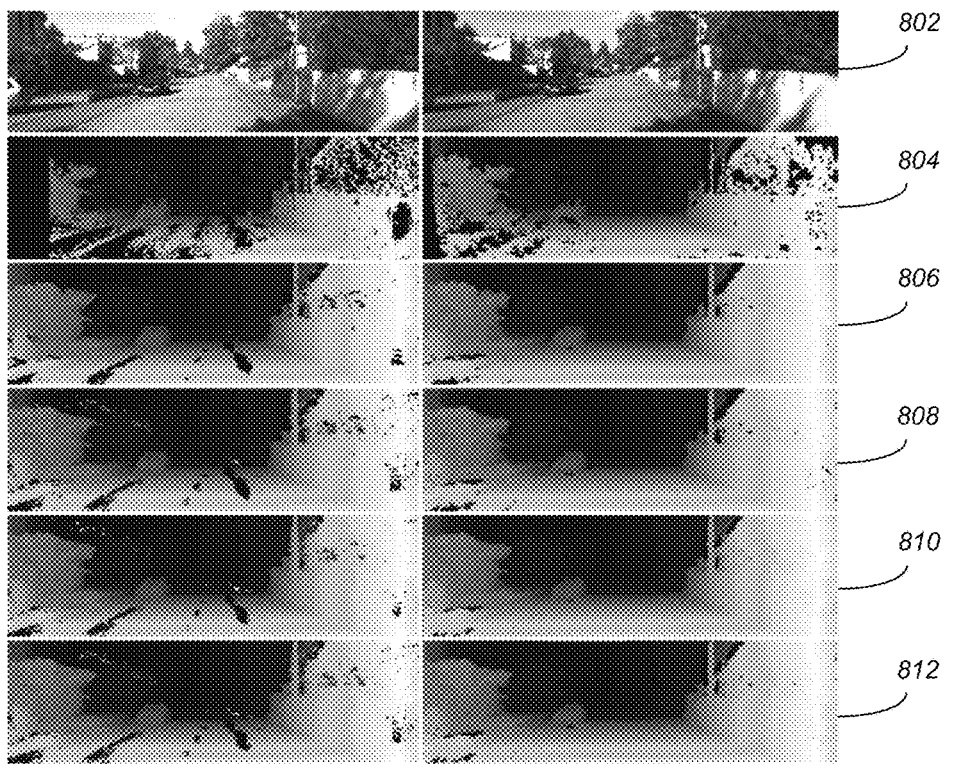
FIG. 8 illustrates a left-right stereo pair, initial disparity maps (SGM left, ELAS right), proposed approach, PFuse, DSM, and Median Filter in accordance with one or more embodiments of the invention.

In both cases, the best average disparity error (D-avg) and best outlier percentage (Out-3%) are achieved by the proposed GMM-based fusion approach with K=3. Performance of temporal fusion is generally less with ELAS than with SGM, because SGM results start out worse. For empty pixels with no disparity assignment, background filling is performed before the evaluation. The proposed technique gives better error percentages than the other methods. PFuse and DSM perform poorly compared to even median filtering due to fast motion of the vehicle. DSM is designed for images captured with down looking cameras on airborne platforms and PFuse for parking assistance; thus, both require small disparity changes between consecutive frames. Apart from the accuracy, density of the proposed approach is lower due to hard constraints to reduce the temporal flickering effect and increase reliability. The completeness of the fused disparity maps could increase by decreasing the thresholds; however, in that case temporal consistency would slightly decrease. One can set the thresholds for the proposed approach such that a minimum number of outliers is observed. In FIG. 7 and FIG. 8, disparity maps of some selected scenes are illustrated, which support the results presented in Table III and Table IV. In particular, FIG. 7 illustrates the left-right stereo pair 702, the initial disparity maps (SGM left, ELAS right) 704, proposed approach 706, PFuse [Unger 2011] 708, DSM [Rumpler 2013] 710, and Median Filter 712. FIG. 8 illustrates the left-right stereo pair 802, initial disparity maps 804 (SGM left, ELAS right), proposed approach 806, PFuse [Unger 2011] 808, DSM [Rumpler 2013] 810, and Median Filter 812.

One cannot show results of TGV [Ntouskos 2016], since they are not available. However, one can assume they are visually similar to the proposed approach given the similar numerical results. Especially for cases where standard stereo matching fails due to change of lighting and reflection, temporal fusion handles this and propagates the previous reliable disparity hypotheses to the unreliable pixels. Outlier spikes in the disparity maps are minimal in the proposed approach, whereas more spikes may be observed in PFuse, DSM, and Median, especially in FIG. 8. In general, the simpler and lower cost the base stereo algorithm, the more benefit we expect will be obtained from temporal fusion; thus, inexpensive local block matching stereo algorithms should benefit even more.

The proposed approach preserves crisp objects boundaries such as the traffic sign and the pole; on the other hand, objects are enlarged by the other techniques. On the traffic sign in FIG. 7, the background is mixed for the remaining techniques, while the proposed approach preserves the valid disparity estimate. This is achieved by the depth based update step, where the recent observations get higher contribution as they are close to the camera.

The average execution times are given in Table V. The timing for TGV-1 is copied from the related paper, which used GPU implementation for a significant speed-up. The remaining techniques were tested on a 3.4 GHz i7-3770 CPU. For the rest of the methods, the same forward warping tool is exploited to be fair with no additional optimizations. A 3×3 closing operation is implemented for PFuse, DSM and Median Filter to fill the holes to an extent in order to increase their performance. The timings in Table V can be further improved with additional optimization for onboard processing. In Table V, efficiency of the proposed approach is clear and is a result of compact representation, decreased number of 3D warping steps and simple update steps. The processing time for PFuse and DSM are high; PFuse exploits additional 3D warping to test different disparity hypotheses on multiple images, while DSM uses an iterative mean-shift approach that is time consuming. The accuracy of temporal fusion improves as longer time windows are exploited. In this case, the proposed approach does not need additional computation, due to the online frame-at-a-time update, while the rest of the multi-view approaches require further computation.

TABLE V

The execution times of the methods

| | Time (sec) | Platform |
|---|---|---|
| TGV [Ntouskos 2016] | 70 | GPU |
| PFuse [Unger 2011] | 23 | CPU |
| DSM [Rumpler 2013] | 25 | CPU |
| Median | 1.3 | CPU |
| Proposed | 0.4 | CPU |

Figure 9:
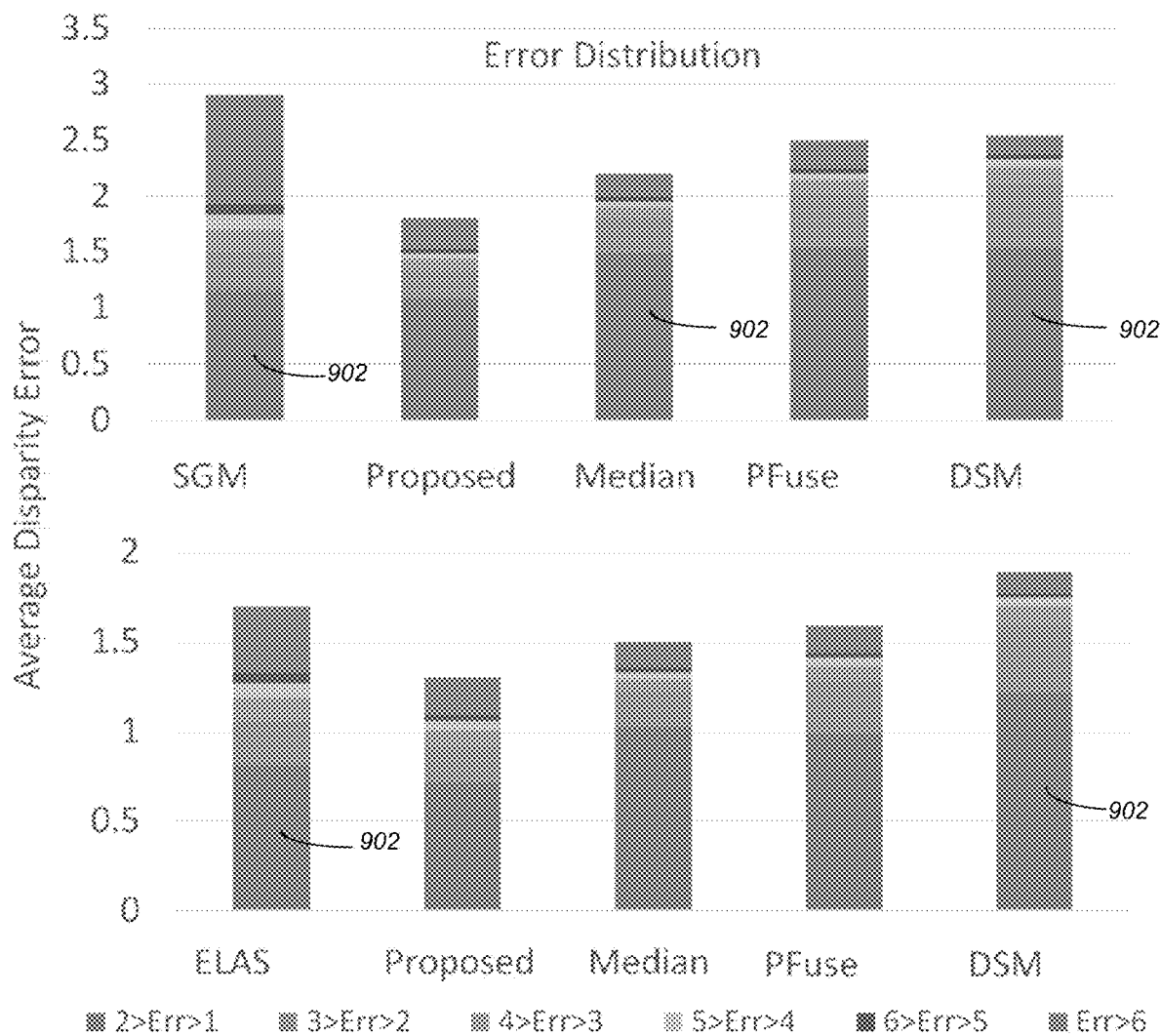
FIG. 9 illustrates a distribution of percentages of pixels with different disparity errors according to different bounds in accordance with one or more embodiments of the invention.

In order to understand the effect of temporal fusion in detail, the percentages of pixels with different disparity errors are illustrated in FIG. 9. In particular, FIG. 9 illustrates the distribution of errors according to different bounds. In these plots, different shading/color indicates the contribution of the pixels of an error region to the average error. For example, after proposed temporal fusion over SGM disparity maps, the pixels with $2>\Delta d>1$ (indicated by shading 902) have the contribution of almost 60% to the average error 1.8. Temporal fusion specifically decreases the number of pixels with high disparity errors. In the meantime, these pixels are shifted to lower error bands as observed by the enlarged percentage of pixels with $2>\Delta d>1$. The refinement is more visible if the initial disparity maps have higher error rates. The error sensitivity may change depending on the application, so providing a complete error distribution yields much clear understanding of the effects of temporal fusion.

Effects of Parameters and VO

The most critical parameter for GMM based fusion is the number of GMMs, since that affects the model complexity and computation time. Embodiments of the invention extracted distributions of the number of GMMs for two long stereo sequences with 10000 frames from the KITTI odometry dataset [Geiger 2012], as well as the dataset used for stereo evaluation (2134 frames). On the average, the mode distributions are given in Table VI. The distribution of models is related to the complexity of the dataset. The odometry sequence involves more moving objects compared to stereo benchmark sequences, so the percentage of side modes is higher than the stereo benchmark set. Since the first three modes cover 90% of the distribution for the stereo benchmark, that is a good choice for algorithm parameter.

TABLE VI

Mode Distribution over Different Stereo Sequences

| | Mode Distribution | | | | |
|---|---|---|---|---|---|
| | 1 Mode | 2 Mode | 3 Mode | 4 Mode | 5 mode |
| Odometry | 52% | 23% | 13% | 7% | 5% |
| Stereo | 64% | 18% | 9% | 5% | 4% |

The distribution of erroneous pixels with different error thresholds is given in Table VII for the proposed approach with three different limiting mode numbers over SGM [Hirschmuller 2005] and ELAS [Geiger 2010] respectively. This error representation yields a comprehensive understanding of the distribution of error. Performance is very similar for all three cases. One of the causes of this small performance difference is that the data set has static scenes.

TABLE VII

The percentages of error for different thresholds by use of different number of GMM modes

| % | [Hirschmuller 2005]/<br>[Hirschmuller 2005] | 1-mode | 2-mode | 3-mode |
|---|---|---|---|---|
| Out-1 | 27.1/25.8 | 10.3/24 | 3023.9 | 29.9/23.8 |
| Out-2 | 16.3/13.5 | 12.5/11 | 12/10.8 | 12.0/10.7 |
| Out-3 | 13.1/9.8 | 8.3/7.4 | 7.9/7.1 | 7.9/7.1 |
| Out-4 | 11.3/7.8 | 6.6/5.6 | 6.2/5.4 | 6.2/5.4 |
| Out-5 | 10.0/6.5 | 5.7/4.6 | 5.3/4.5 | 5.3/4.7 |
| Out-6 | 9.1/5.6 | 4.9/3.9 | 4.6/3.8 | 4.6/3.7 |
| Davg | 2.9/1.7 | 1.9/1.4 | 1.8/1.3 | 1.8/1.3 |

In order to test the robustness of the proposed approach, the same experiments were conducted with three different VO algorithms [Geiger 2011], [Kitt 2010], and [Ntouskos 2013] for 3-mode GMM fusion. Table VIII shows the error distributions as the percentage of pixels with quantized errors.

TABLE VIII

The percentages of error for different thresholds for GMM based fusion, K = 3, with respect to VO poses

| % | [Hirschmuller 2005]/<br>Geiger 2010 | [Geiger 2011] | [Kitt 2010] | [Ntouskos 2013] |
|---|---|---|---|---|
| Out-1 | 27.1/25.8 | 29.9/24 | 30.2/24.3 | 30.7/24.7 |
| Out-2 | 16.3/13.5 | 12.0/11 | 12.8/11.3 | 13.2/11.7 |
| Out-3 | 13.1/9.8 | 7.9/7.1 | 8.5/7.6 | 8.7/7.9 |
| Out-4 | 11.3/7.8 | 6.2/5.4 | 6.6/5.9 | 6.8/6.0 |
| Out-5 | 10.0/6.5 | 5.3/4.4 | 5.6/4.8 | 5.7/4.9 |
| Out-6 | 9.1/5.6 | 4.6/3.7 | 4.9/4.1 | 4.9/4.2 |
| Davg | 2.9/1.7 | 1.8/1.3 | 1.8/1.4 | 1.8/1.4 |

The VO poses provided by [Kitt 2010] are improved in [Geiger 2011] which is a newer study. [Ntouskos 2013] has the worst VO pose estimates among the three, which are used in TGV [Ntouskos 2016]. According to the results in Table VIII, the accuracy of VO poses affects the performance of temporal refinement, as expected. However, all VO poses result in same average disparity error and the differences for high error percentages are almost insignificant. On the other hand, the difference for low error pixels rates is significant. These show that the proposed approach is robust against different visual odometry accuracy in terms of average disparity error as long as VO performs well enough to relate consecutive frames.

Temporal Depth Fusion Conclusions

In this section of the patent application, an efficient GMM inspired approach to fuse disparity maps temporally is described. Each pixel is represented by a mixture of multiple models accumulated through previous observations. This compact representation is mapped to the following frame via the 3D transformation between camera poses. The models are utilized to refine the recent disparity observations and updated for the next frames. The online update approach fuses temporal data efficiently and does not require any time window. According to comprehensive experiments, the proposed approach is an efficient alternative for the state-of-the-art with far lower computational complexity and competitive accuracy. The proposed approach yields temporally consistent, flicker-free disparity maps with fewer errors and more complete representation, which are vital for collision avoidance. Use of multiple models may also enable the detection and segmentation of independently moving objects in complex environments, which remains as a future direction of this study.

CONCLUSION

This concludes the description of the preferred embodiment of the invention. In particular, embodiments of the invention provide a compact, efficient representation pipeline for motion planning for configuration flat robots using a data structure based on egospace coordinates. Egospace obstacle representations can be tailored to a wide range of environments and are particularly convenient for obstacle avoidance or motion planning operations that require online collision-checking. The use of egospace motion primitives for this task allows for fast collision-checking and can accommodate a varying level of completeness and dynamic fidelity.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Bohlin 2000] R. Bohlin and L. E. Kavraki. Path planning using Lazy PRM. In ICRA, 2000.

[Brockers 2016] R. Brockers et al. Stereo vision-based obstacle avoidance for micro air vehicles using an egocylindrical image space representation. In Micro- and Nano-technology Sensors, Systems, and Applications VIII, 2016.

[Brockers2 2016] R. Brockers et al. Vision-based obstacle avoidance for micro air vehicles using an egocylindrical depth map. In ISER, (in press) 2016.

[Chitsaz 2008] H. Chitsaz and S. M. LaValle. Time-optimal paths for a Dubins airplane. In Control and Decision Conference (CDC), 2008.

[Faulwasser 2014] T. Faulwasser et al. Constrained reachability and trajectory generation for flat systems. Automatica, 50(4):1151-1159, 2014.

[Fraudorfer 2012] F. Fraundorfer et al. Vision-based autonomous mapping and exploration using a quadrotor MAV. In IROS, 2012.

[Frazzoli 2005] E. Frazzoli et al. Maneuver-based motion planning for nonlinear systems with symmetries. IEEE Trans. Robotics, 21(6):1077-1091, 2005.

[Hornung 2013] A. Hornung et al. OctoMap: an efficient probabilistic 3d mapping framework based on octrees. Auton Robot, 34(189), 2013.

[Kahler 2016] O. Kahler et al. Hierarchical voxel block hashing for efficient integration of depth images. In ICRA, 2016.

[Keshavan 2015] J. Keshavan et al. Autonomous vision-based navigation of a quadrotor in corridor-like environments. Micro Air Vehicles, 7(2):111-123, 2015.

[Matthies 2014] L. Matthies et al. Stereo vision-based obstacle avoidance for micro air vehicles using disparity space. *IEEE International Conference on Robotics and Automation*, pages 3242-3249, May 2014.

[Mellinger 2011] D. Mellinger and V. Kumar. Minimum snap trajectory generation and control for quadrotors. In ICRA, 2011.

[Murray 1995] R. M. Murray et al. Differential flatness of mechanical control systems: a catalog of prototype systems. In ASME Intl Mech Eng Congress and Expo, 1995.

[Otte 2009] M. W. Otte et al. Path planning in image space for autonomous robot navigation in unstructured outdoor environments. J. Field Robotics, 26(2):212-240, 2009.

[Powers 2015] C. Powers et al. Quadrotor kinematics and dynamics. In Handbook of Unmanned Aerial Vehicles. Springer Netherlands, 2015.

[Rathinam 1996] M. Rathinam and R. M. Murray. Configuration flatness of Lagrangian systems underactuated by one control. In Control and Decision Conference (CDC), 1996.

[Richter 2013] C. Richter et al. Polynomial trajectory planning for aggressive quadrotor flight in dense indoor environments. In ISRR, 2013.

[Thomas 2014] J. Thomas et al. Toward image based visual servoing for aerial grasping and perching. In ICRA, 2014.

[Scharstein 2002] D. Scharstein and R. Szeliski, A taxonomy and evaluation of dense two-frame stereo correspondence algorithms. *International Journal of Computer Vision*, 47(1/2/3):7-42, April-June 2002.

[Scharstein 2014] D. Scharstein, H. Hirschmüller, Y. Kitajima, G. Krathwohl, N. Nesic, X. Wang, and P. Westling, Highresolution stereo datasets with subpixel-accurate ground truth. *German Conference on Pattern Recognition*, September 2014.

[Geiger 2012] A. Geiger, P. Lenz and R. Urtasun, Are we ready for Autonomous Driving? The KITTI Benchmark Suite. *Conference on Computer Vision and Pattern Recognition*, 2012.

[Cole 2006] D. Cole and P. Newman, Using Laser Range Data for 3D SLAM in Outdoor Environments. *IEEE International Conference on Robotics and Automation*, 2006.

[Dryanovski 2010] I. Dryanovski, W. Morris and J. Xiao, Multi-volume Occupancy Grids: An Efficient Probabilistic 3D Mapping Model for Micro Aerial Vehicle. *International Conference on Intelligent Robotics and Systems*, 2010.

[Dolson 2010] J. Dolson et al, Upsampling Range Data in Dynamic Environments, *Conference on Computer Vision and Pattern Recognition*, 2010.

[Yang 2007] Q. Yang, R. Yang, J. Davis, and D. Nister. Spatial-depth Super Resolution for Range Images. *Proc. Conference on Computer Vision and Pattern Recognition*, 2007.

[Park 2011] J. Park, H. Kim, Y. W. Tai, M. Brown, and I. Kweon, High Quality Depth Map Up-sampling for 3d-tof cameras. *International Conference on Computer Vision*, 2011.

[Ferstl 2013] D. Ferstl, C. Reinbacher, R. Ranftl, M. Ruether, and H. Bischof. Image Guided Depth Up-sampling using Anisotropic Total Generalized Variation. *International Conference on Computer Vision*, 2013.

[Kopf 2007] J. Kopf et al, Joint Bilateral Up-sampling. SIGGRAPH 2007.

[Liu 2013] M. Y. Liu, O. Tuzel and Y. Taguchi, Joint Geodesic Upsampling of Depth Images. *Conference on Computer Vision and Pattern Recognition*, 2013.

[Schneider 2016] N. Schneider et' al. Semantically Guided Depth Upsampling. arXiv: 1608.00753, August 2016.

[Lu 2015] J. Lu, D. Forsyth, Sparse Depth Super Resolution, *International Conference on Computer Vision and Pattern Recognition*, 2015.

[Matsuo 2015] K. Matsuo, Y. Aoki, Depth Image Enhancement Using Local Tangent Plane Approximations. *International Conference on Computer Vision and Pattern Recognition*, 2015.

[Min 2012] D. Min, J. Lu and M. N. Do, Depth Video Enhancement Based on Weighted Mode Filtering. *IEEE Transactions on Image Processing*, 21(3), March 2012.

[Schmid 2013] K. Schmid et al, Stereo Vision based indoor/outdoor Navigation for Flying Robots. *International Conference on Intelligent Robots and Systems*, 2013.

[Zhang 2009] G. Zhang et al, consistent Depth Maps Recovery from a Video Sequence. *IEEE Transactions on Pattern Analysis and Machine Intelligence*, 31(6), June 2009.

[Pizzoli 2014] M. Pizzoli, C. Forster and D. Scaramuzza, REMODE: Probabilistic, Monocular Dense Reconstruction in Real Time. *IEEE International Conference on Robotics and Automation* 2014.

[Richardt 2010] C. Richardt et al, Real-time Spatiotemporal Stereo Matching Using the Dual-Cross-Bilateral Grid, *European conference on Computer vision*, 2010.

[Hosni 2011] A. Hosni, C. Rhemann, M. Bleyer, M. Gelautz, Temporally Consistent Disparity and Optical Flow via Efficient Spatio-Temporal Filtering. *Pacific-Rim Symposium on Image and Video Technology*, 2011.

[Pham 2012] C. C. Pham et al. Efficient Spatio-Temporal Local Stereo Matching Using Information Permeability Filtering. *International Conference on Image Processing*, 2012.

[Foster 2014] C. Foster, M. Pizzoli and D. Scaramuzza. SVO: Fast Semi-Direct Monocular Visual Odometry. *IEEE International Conference on Robotics and Automation*, 2014.

[Engel 2013] J. Engel, J. Strum and D. Cremers, Semi-Dense Visual Odometry for a Monocular Camera. *IEEE International Conference on Computer Vision*, 2013.

[Engel 2015] J. Engel, J. Stueckler and D. Cremers. Large-Scale Direct SLAM with Stereo Cameras. *International Conference on Intelligent Robots and Systems*, 2015.

[Newcombe 2011] A. R. Newcombe et al, KinectFusion: Real-time Dense Surface Mapping and Tracking. *IEEE International Symposium on Mixed and Augmented Reality*, 2011.

[Or-El 2015] R. Or-El et al. RGBD_Fusion: Real-time High Precision Depth Recovery. *International Conference on Computer Vision and Pattern Recognition*, 2015.

[Unger 2011] C. Unger, E. Wahl, P. Strum and S. Ilic, Probabilistic Disparity Fusion for Real-time Motion Stereo. *Machine Vision and Applications*, Vol 25, 2011.

[Ntouskos 2016] V. Ntouskos and F. Pirri, Confidence Driven TGV Fusion. arXiv: 1603.09302, March 2016.

[Stauffer 1999] C. Stauffer and W. Grimson, Adaptive Background Mixture Models for Real-time Tracking. *International Conference on Computer vision and Pattern Recognition,* 1999.

[Geiger 2011] A. Geiger, J. Ziegler and C. Stiller, Stereo-Scan: Dense 3D Reconstruction in Real-time. *Intelligent Vehicles Symposium,* 2011.

[Kitt 2010] B. Kitt, A. Geiger and H. Lategahn. Visual Odometry based on Stereo Image Sequences with RANSAC-based Outlier Rejection Scheme. *Intelligent Vehicle Symposium,* 2010.

[Ntouskos 2013] V. Ntouskos et al. Saliency Prediction in Coherence Theory of Attention. *Biologically Inspired Cognitive Architectures,* 2013.

[Hirschmuller 2005] H. Hirschmuller, Accurate and Efficient Stereo Processing by Semi-Global Matching and Mutual Information. *International Conference on Computer Vision and Pattern Recognition,* 2005.

[Geiger 2010] A. Geiger, M. Roser and R. Urtasun, Efficient Large Scale Stereo Matching, *Ascian Conference on Computer Vision,* 2010.

What is claimed is:

1. A method for controlling an unmanned aerial vehicle (UAV) to avoid obstacle collision, comprising:
   (a) acquiring range data of a real-world scene using one or more range sensors, wherein the range data comprises depth data to one or more visible objects;
   (b) combining the range data into an egospace representation comprising a first set of one or more pixels in egospace, wherein:
      (1) each pixel in the first set of one or more pixels corresponds to a specific direction;
      (2) each pixel in the first set of one or more pixels stores a depth;
      (3) the depth comprises a distance, to one of the one or more visible objects encountered in the specific direction; and
      (4) the egospace comprises a coordinate system given by a second set of all possible pixel and depth combinations;
   (c) expanding an apparent size of each of the one or more visible objects based on a dimension of the UAV, wherein the UAV comprises a configuration flat vehicle (CFV), wherein a UAV with state variables x, control inputs u, and state equations $\dot{x}=f(x,u)$ comprises a CFV if there exists a set of flat outputs $$z=\alpha(x,u,\dot{u},\ldots,u^{(k)}),$$

that are a smooth function $\alpha$ of the state variables and control inputs, smooth functions $\beta$ and $\gamma$ such that $$x=\beta(z,\dot{z},\ldots,z^{(j)}),$$

$$u=\gamma(z,\dot{z},\ldots,z^{(j)}),$$

and obstacle and configuration spaces O, C ⊂ {z} such that C={z}\O;
   (d) receiving an assigned destination in the real world scene based on world space;
   (e) transforming the assigned destination into egospace coordinates in egospace;
   (f) generating a trackable path from the UAV to the assigned destination through egospace that avoids collision with the one or more visible objects based on the expanded apparent sizes of each of the one or more visible objects; and
   (g) identifying and providing one or more inputs to control the UAV to follow the trackable path, and wherein the UAV follows the trackable path based on the one or more inputs.

2. The method of claim 1, wherein for each of the one or more pixels of the egospace representation, a value is assigned that uniquely encodes the distance to the one of the one or more visible objects from a defined focal point, wherein the defined focal point is an arbitrary origin.

3. The method of claim 1, wherein the generating the trackable path comprises:
   generating one or more predefined maneuvers simultaneously in egospace and world space; and
   selecting and linking one or more of the predefined maneuvers to generate the trackable path.

4. The method of claim 1, wherein the generating the trackable path comprises:
   generating one or more waypoints in egospace;
   searching for a sequence of the one or more waypoints that define the trackable path; and
   wherein the searching comprises comparing the depth of the one or more visible objects to egospace coordinates of the one or more waypoints to determine whether the one or more waypoints and segments connecting the one or more waypoints are valid.

5. The method of claim 4, wherein the searching is performed dynamically on the fly on board the UAV.

6. The method of claim 1, wherein the generating the trackable path comprises:
   (a) determining an acceptable time to contact;
   (b) checking if the assigned destination in egospace is collision free within the acceptable time to contact, wherein the checking comprises:
      (1) converting the acceptable time to contact to an acceptable depth value; and
      (2) comparing the acceptable depth value against a depth value corresponding to one of the one or more visible objects that occlude the assigned destination;
   (c) repeating (b) for each of the one or more pixels of the egospace representation;
   (d) selecting one of the one or more pixels in the egospace representation that is collision free as a target; and
   (e) configuring the UAV wherein a velocity vector of the UAV aligns with the target.

7. A navigation framework in an unmanned aerial vehicle that avoids obstacle collision:
   (a) an embedded flight computer integrated into the UAV that enables the UAV to maneuver, wherein the UAV:
      (1) acquires range data of a real-world scene using one or more range sensors mounted on the UAV, wherein the range data comprises depth data to one or more visible objects;
      (2) combines the range data into an egospace representation comprising a first set of one or more pixels in egospace, wherein:
         (A) each pixel in the first set of one or more pixels corresponds to a specific direction;
         (B) each pixel in the first set of one or more pixels stores a depth;
         (C) the depth comprises a distance, to one of the one or more visible objects encountered in the specific direction; and
         (D) the egospace comprises a coordinate system given by a second set of all possible pixel and depth combinations;
      (3) expands an apparent size of each of the one or more visible objects based on a dimension of the UAV, wherein the UAV comprises a configuration flat vehicle (CFV), wherein a UAV with state variables x, control inputs u, and state equations $\dot{x}=f(x,u)$ comprises a CFV if there exists a set of flat outputs $$z=\alpha(x,u,\dot{u},\ldots,u^{(k)}),$$

that are a smooth function $\alpha$ of the state variables and control inputs, smooth functions $\beta$ and $\gamma$ such that $$x=\beta(z,\dot{z},\ldots,z^{(j)}),$$

$$u=\gamma(z,\dot{z},\ldots,z^{(j)}),$$

and obstacle and configuration spaces O, $C \subset \{z\}$ such that $C=\{z\}\backslash O$;
- (4) receives an assigned destination in the real world scene based on world space;
- (5) transforms the assigned destination into egospace coordinates in egospace;
- (6) generates a trackable path from the UAV to the assigned destination through egospace that avoids collision with the one or more visible objects based on the expanded apparent sizes of each of the one or more visible objects; and
- (7) identifies and provides one or more inputs to control the UAV to follow the trackable path, and wherein the UAV follows the trackable path based on the one or more inputs.

8. The navigation framework of claim 7, wherein for each of the one or more pixels of the egospace representation, a value is assigned that uniquely encodes the distance to the one of the one of the one or more visible objects from a defined focal point, wherein the defined focal point is an arbitrary origin.

9. The navigation framework of claim 7, wherein the embedded flight computer generates the trackable path by:

generating one or more predefined maneuvers simultaneously in egospace and world space; and
selecting and linking one or more of the predefined maneuvers to generate the trackable path.

10. The navigation framework of claim 7, wherein the embedded flight computer generates the trackable path by:
generating one or more waypoints in egospace;
searching for a sequence of the one or more waypoints that define the trackable path; and
wherein the searching comprises comparing the depth of the one or more visible objects to egospace coordinates of the one or more waypoints to determine whether the one or more waypoints and segments connecting the one or more waypoints are valid.

11. The navigation framework of claim 10, wherein the embedded flight computer searches dynamically on the fly on board the UAV.

12. The navigation framework of claim 7, wherein the embedded flight computer generates the trackable path by:
- (a) determining an acceptable time to contact;
- (b) checking if the assigned destination in egospace is collision free within the acceptable time to contact, wherein the checking comprises:
  - (1) converting the acceptable time to contact to an acceptable depth value; and
  - (2) comparing the acceptable depth value against a depth value corresponding to one of the one or more visible objects that occlude the assigned destination;
- (c) repeating (b) for each of the one or more pixels of the egospace representation;
- (d) selecting one of the one or more pixels in the egospace representation that is collision free as a target; and
- (e) configuring the UAV wherein a velocity vector of the UAV aligns with the target.

\* \* \* \* \*